(12) United States Patent
Brunner et al.

(10) Patent No.: US 11,039,605 B2
(45) Date of Patent: *Jun. 22, 2021

(54) AQUARIUM FILTER ARRANGEMENT WITH CONTROL VALVE

(71) Applicant: Spectrum Brands, Inc., Middleton, WI (US)

(72) Inventors: William Nathan Brunner, St. Peters, MO (US); John Lewis Shumate, Shawsville, VA (US); William D. Himes, Radford, VA (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,523

(22) Filed: Mar. 17, 2020

(65) Prior Publication Data

US 2020/0214272 A1    Jul. 9, 2020

Related U.S. Application Data

(63) Continuation of application No. 15/819,892, filed on Nov. 21, 2017, now Pat. No. 10,638,732.

(51) Int. Cl.
| | |
|---|---|
| *A01K 63/04* | (2006.01) |
| *B01D 35/30* | (2006.01) |
| *B01D 35/15* | (2006.01) |
| *B01D 35/26* | (2006.01) |
| *F16L 55/07* | (2006.01) |
| *B01D 35/157* | (2006.01) |

(52) U.S. Cl.
CPC ........ *A01K 63/045* (2013.01); *B01D 35/1573* (2013.01); *B01D 35/26* (2013.01); *B01D 35/30* (2013.01); *B01D 2201/301* (2013.01); *F16L 55/07* (2013.01)

(58) Field of Classification Search
CPC .. A01K 63/045; B01D 35/30; B01D 35/1573; B01D 35/26; B01D 2201/301; F16L 55/07
USPC ... 210/167.21, 167.22, 167.27, 416.1, 416.2; 119/259, 260
See application file for complete search history.

(56) References Cited

U.S. PATENT DOCUMENTS

| | | |
|---|---|---|
| 4,886,093 A | 12/1989 | Itakura et al. |
| 5,002,660 A | 3/1991 | Sherman et al. |
| 5,228,986 A | 7/1993 | Ellis et al. |

(Continued)

*Primary Examiner* — Fred Prince
(74) *Attorney, Agent, or Firm* — Merchant & Gould P.C.

(57) ABSTRACT

A filter arrangement for an aquarium is disclosed. The filter arrangement can include a housing assembly, a pump assembly, a transfer tube assembly, and a valve assembly for controlling water flow through the transfer tube assembly. The transfer tube assembly can include a tube structure within which a valve body of the valve assembly is rotatably disposed. The tube structure can be formed from a first tube half mated to a second tube half to permanently secure the valve body within the tube structure. A valve operator can be connected to the valve body to advantageously allow a user to manipulate the flow of water through the transfer tube assembly. Control of water flow through the filter arrangement is beneficial for obtaining a desired water flow for a certain aquarium size and application and for reducing flow during certain periods, such as during feeding.

7 Claims, 29 Drawing Sheets

(56) References Cited

U.S. PATENT DOCUMENTS

| | | | |
|---|---|---|---|
| 5,397,463 A * | 3/1995 | Woltmann | A01K 63/045 |
| | | | 119/260 |
| 5,603,831 A | 2/1997 | Hickok | |
| 5,728,293 A * | 3/1998 | Guoli | A01K 63/045 |
| | | | 210/151 |
| 5,965,016 A * | 10/1999 | Suchowski | C02F 3/085 |
| | | | 210/167.22 |
| 6,797,163 B2 | 9/2004 | Carley et al. | |
| 7,001,509 B1 | 2/2006 | Lin | |
| 7,252,762 B2 | 8/2007 | Carley | |
| 7,316,775 B2 | 1/2008 | Carley et al. | |
| 7,651,609 B2 | 1/2010 | Huehn | |
| 10,638,732 B2 * | 5/2020 | Brunner | B01D 35/30 |
| 2005/0258086 A1 | 11/2005 | Lin | |

\* cited by examiner

AQUARIUM FILTER ARRANGEMENT WITH CONTROL VALVE

CROSS REFERENCE TO RELATED APPLICATIONS

This application is a continuation of U.S. patent application Ser. No. 15/819,892, filed Nov. 21, 2017, which is incorporated herein by reference in its entirety.

TECHNICAL FIELD

This disclosure relates generally to methods and devices for filtering aquarium water. More particularly, this disclosure relates to a filter housing arrangement and methods related to use of the filter housing arrangement.

BACKGROUND

To maintain an ecological balance within an aquarium, it is necessary to keep the water in the aquarium clean. Cleaning is often accomplished by pumping water from the aquarium to a filter device, filtering the water through a filter medium, and returning the filtered water to the aquarium. Such filtering devices generally include an internal pump driven by an electric motor for pumping the water through the filter medium. During operation of the pump and motor assembly, it is sometimes desired to control the flow provided by the pump. Devices exist in the prior art for this purpose. However, some are difficult to operate and/or are not provided integrally with the remainder of the filter device.

In general improvements in filtering devices are sought.

SUMMARY

A filter arrangement for an aquarium is disclosed. In some examples, the filter arrangement includes a housing assembly, a pump assembly, a transfer tube assembly, and a valve assembly for controlling water flow through the transfer tube assembly.

In some examples, the housing assembly includes a housing and a removable cover, wherein the housing and cover defining an interior volume within which a filter cartridge is disposed.

In some examples, the transfer tube assembly has an inlet and an outlet and is operably connected to the pump outlet and the transfer tube outlet is in fluid communication with the interior volume upstream of the filter cartridge.

In some examples, the transfer tube assembly includes a tube structure within which a valve body of the valve assembly is rotatably disposed.

In some examples, the tube structure is formed from a first tube half and a second tube half mated to the first tube half.

In some examples, the first and second tube halves are bonded to each other.

In some examples, the valve body is non-removable from the tube structure after the first and second tube halves are bonded to each other.

In some examples, the valve assembly includes a rotatable valve body and a valve operator connected to the valve body.

In some examples, a portion of the valve operator extends through an aperture of the removable cover of the housing assembly.

In some examples, the valve operator includes an indicator for providing a visual indication of the position of the valve operator.

In some examples, the transfer tube assembly includes a first stop surface against which the valve operator abuts when the valve operator is rotated to a position corresponding to the valve body being in a fully open position. The first stop surface can be located on a tube structure of the transfer tube assembly.

In some examples, the transfer tube assembly includes a second stop surface against which the valve operator abuts when the valve operator is rotated to a position corresponding to the valve body being in a relatively closed position. The second stop surface can be located on a tube structure of the transfer tube assembly.

In some examples, the valve assembly further includes a seal member mounted to the valve operator, wherein the seal member forms a seal between the valve operator and a tube structure of the transfer tube assembly.

In one aspect of the disclosure the transfer tube assembly can include a tube structure including a first tube half and a second tube half mated to the first tube half, wherein the tube structure defines a valve cavity between an inlet end of the tube structure and an outlet end of the tube structure. In such an example, a valve body can be rotatably disposed within the valve cavity of the tube structure, wherein the valve body is rotatable to limit water flow through the tube structure. In one aspect, a valve operator can be connected to the valve body, wherein the valve operator is for manipulating the rotational position of the valve body. A seal member can also be provided for forming a seal between the valve operator and the tube structure.

In some examples, the tube structure includes a first stop surface against which the valve operator abuts when the valve operator is rotated to a position corresponding to the valve body being in a fully open position.

In some examples, the tube structure includes a second stop surface against which the valve operator abuts when the valve operator is rotated to a position corresponding to the valve body being in a relatively closed position.

In some examples, the tube structure defines a recessed portion within which a valve member of the valve body resides when the valve body is in a fully open position.

In one aspect of the disclosure, a method for constructing a transfer tube assembly for of an aquarium filter arrangement for an aquarium is presented. In one example, the method can include the steps of inserting a valve body into a first cavity portion of a first tube half, joining a second tube half to the first tube half such that the valve body is received into a second cavity portion of the second tube half, and bonding the first tube half to the second tube half to secure the valve body between the first and second tube halves.

In some examples, the method includes mounting a valve operator to the valve body.

In some examples, the bonding step includes sonic welding.

In some examples, the step of mounting the valve operator includes mounting the valve operator such that a seal member forms a seal between the valve operator and the first tube half.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

One aspect of the present disclosure relates to a filter arrangement for use with an aquarium.

DETAILED DESCRIPTION

Figure 1:
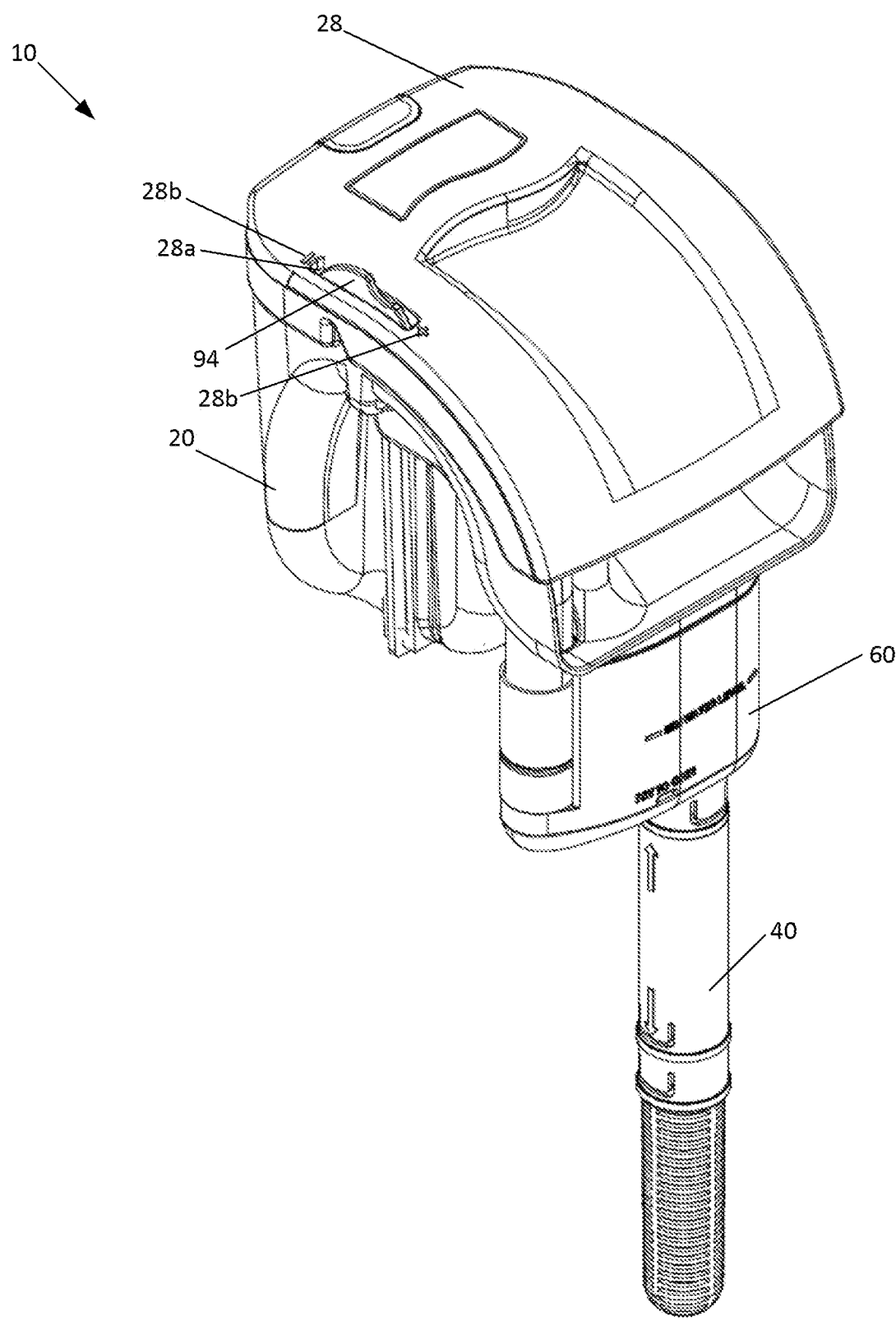
FIG. 1 is a front perspective view of a filter arrangement in accord with the principles of the present disclosure.
Figure 2:
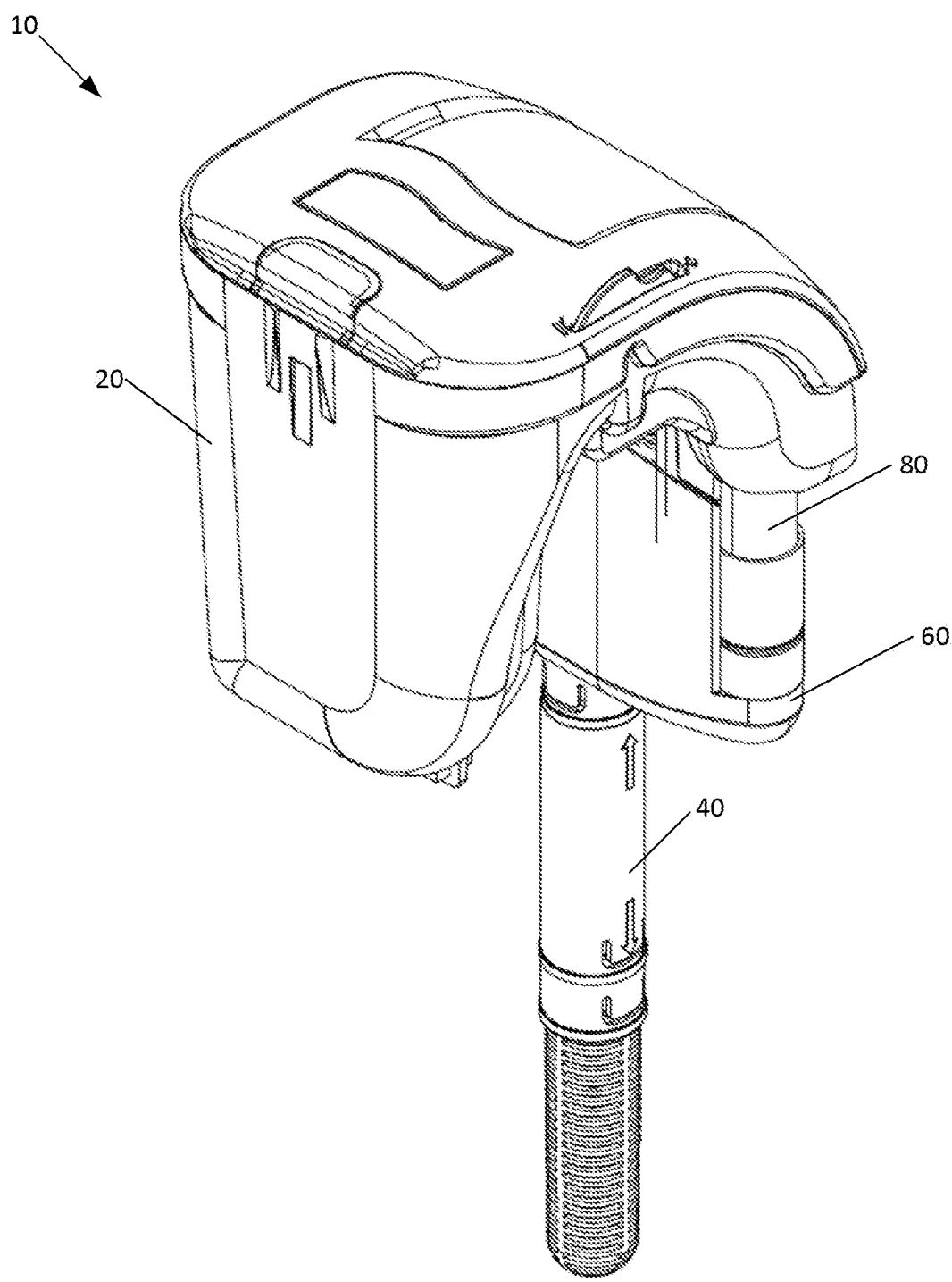
FIG. 2 is a rear perspective view of the filter arrangement shown in FIG. 1.
Figure 3:
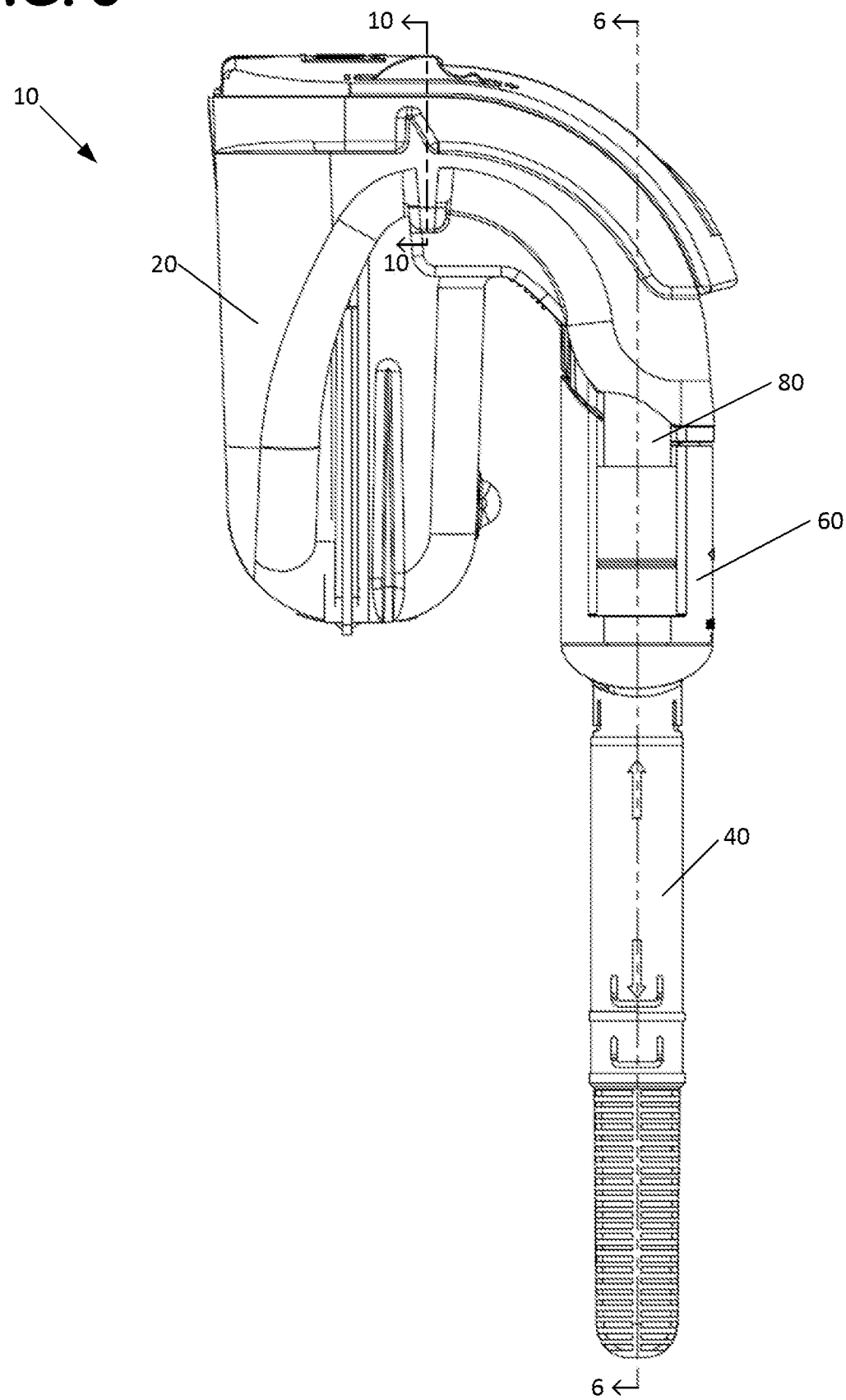
FIG. 3 is a first side view of the filter arrangement shown in FIG. 1.
Figure 4:
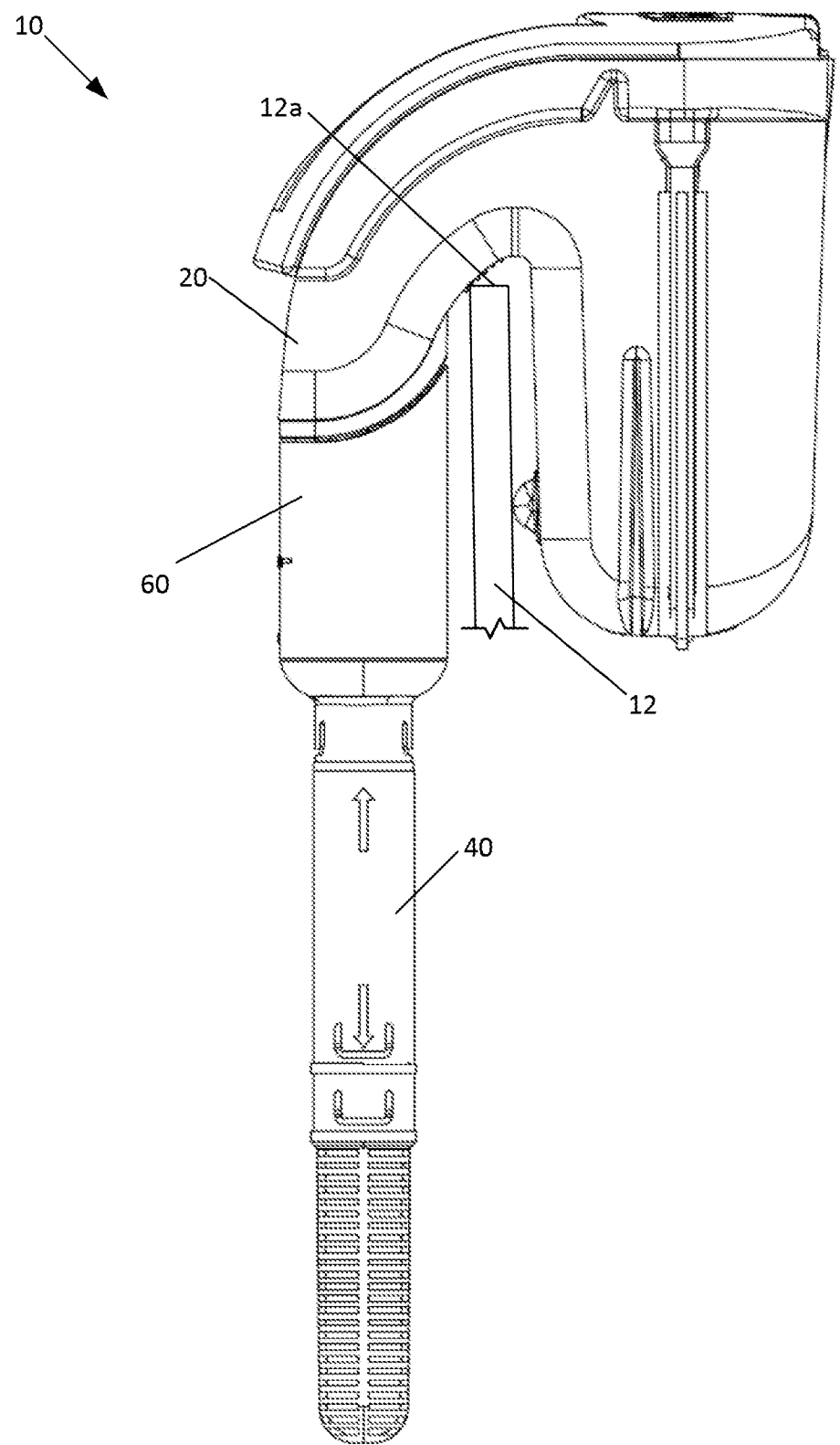
FIG. 4 is a second side view of the filter arrangement shown in FIG. 1.
Figure 5:
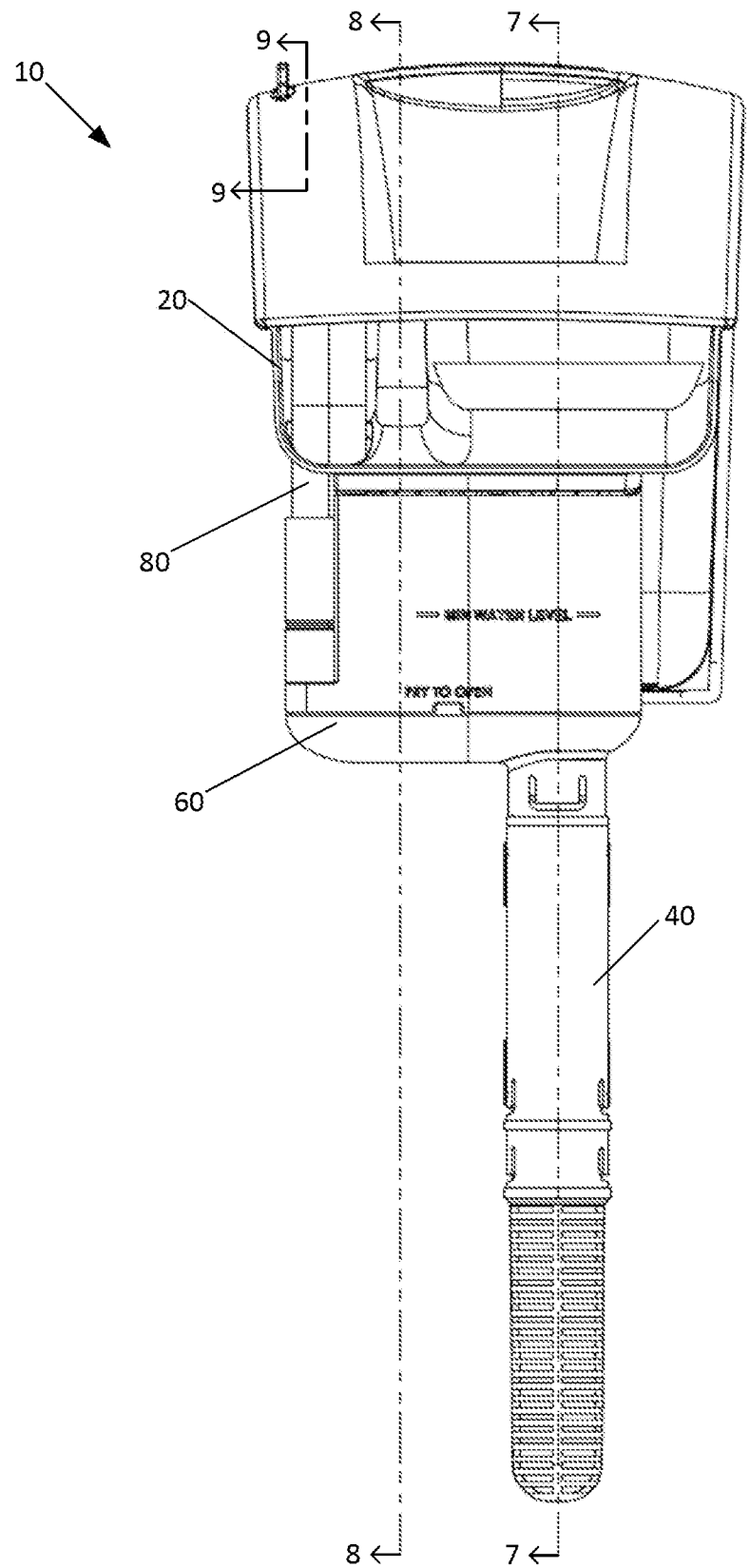
FIG. 5 is a front view of the filter arrangement shown in FIG. 1.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

General Construction

FIGS. 1-9 illustrate a filter arrangement 10 having features that are examples of how inventive aspects in accordance with the principles of the present disclosure may be practiced. Preferred features are adapted for reducing the generation of vibration and noise emanating from the filter arrangement 10.

As shown in FIG. 1, the filter arrangement 10 generally includes a filter housing assembly 20, an intake tube assembly 40, a pump assembly 60, and a transfer tube assembly 80. When the pump assembly 60 is activated, water is drawn by the pump assembly 60 from the aquarium 12 (partially, schematically illustrated at FIG. 4) through the intake tube assembly 40 and is delivered to the transfer tube assembly 80. From the transfer tube assembly 80, the pumped water passes through a filter cartridge 24 disposed within a housing 22 of the filter housing assembly 20, and is then returned to the aquarium via a spillway 22d formed in the housing 22. As is discussed in detail later, dampening structures are provided at the connection point between the pump assembly 60 and the housing assembly 20, at the connection point between the transfer tube assembly 80 and the housing assembly 20, and at the connection point between the transfer tube assembly 80 and the pump assembly 60. Theses dampening structures greatly reduce the transmission of vibration and sound generated by the pump assembly 60 to the housing assembly 20 directly from the pump assembly 60 and via the transfer tube assembly 80.

Filter Housing Assembly 20

Figure 9:
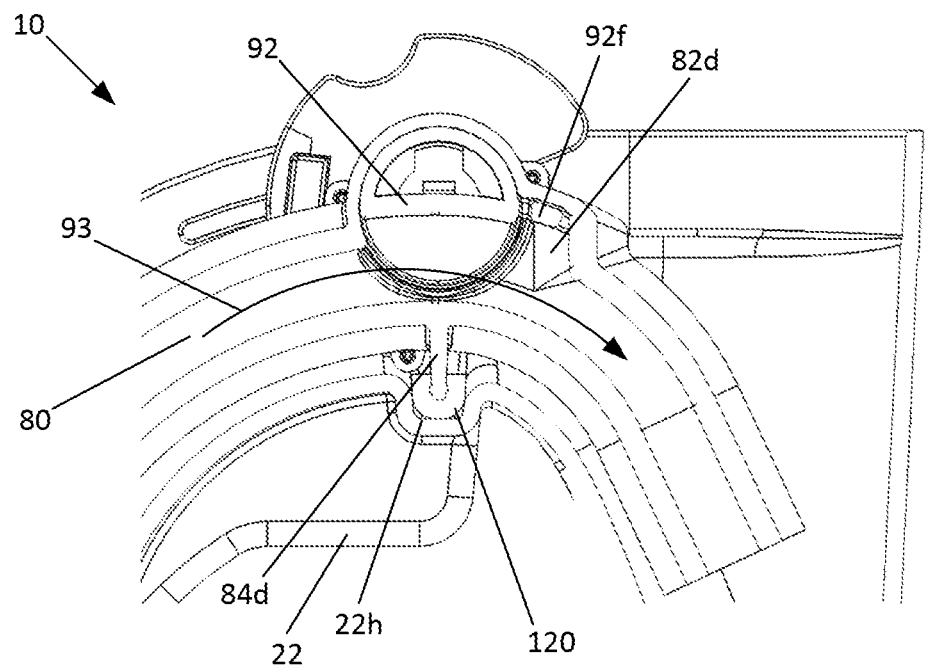
FIG. 9 is a cross-sectional view of a portion of the transfer tube assembly of the filter arrangement shown in FIG. 1, taken along the line 9-9 in FIG. 5.
Figure 10:
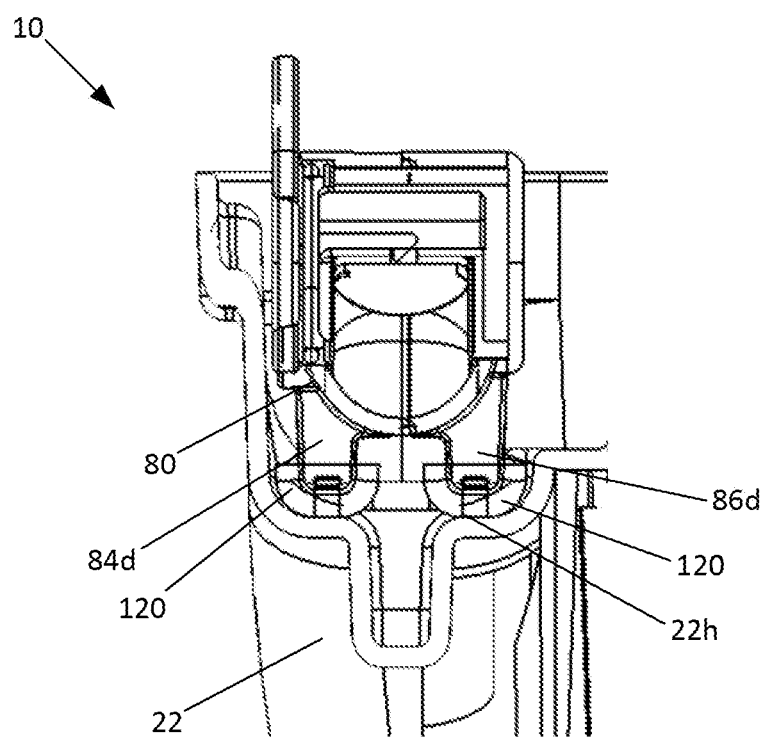
FIG. 10 is a cross-sectional view of a portion of the transfer tube assembly of the filter arrangement shown in FIG. 1, taken along the line 10-10 in FIG. 3.
Figure 11:
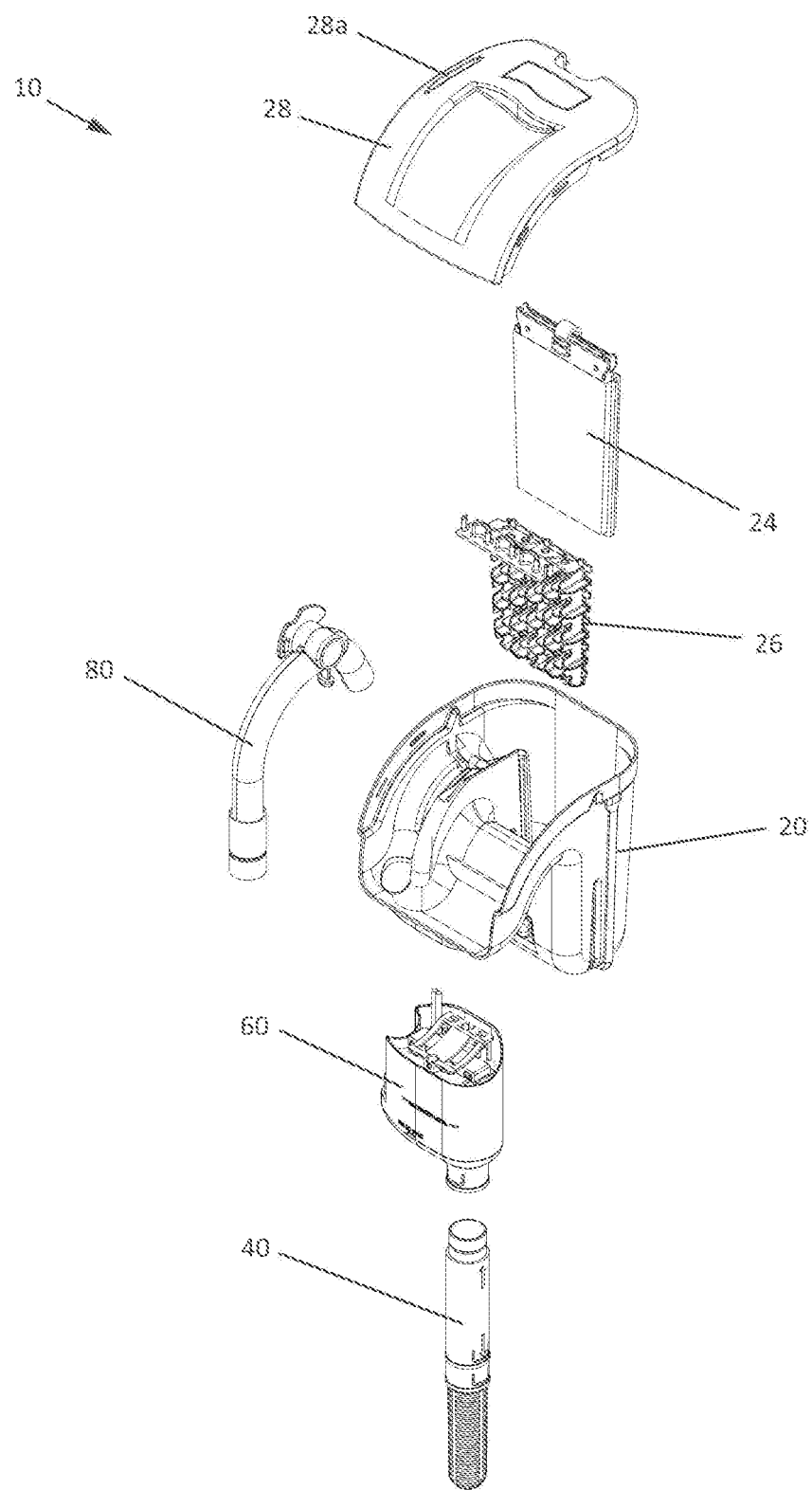
FIG. 11 is an exploded perspective view of the filter arrangement shown in FIG. 1.
Figure 12:
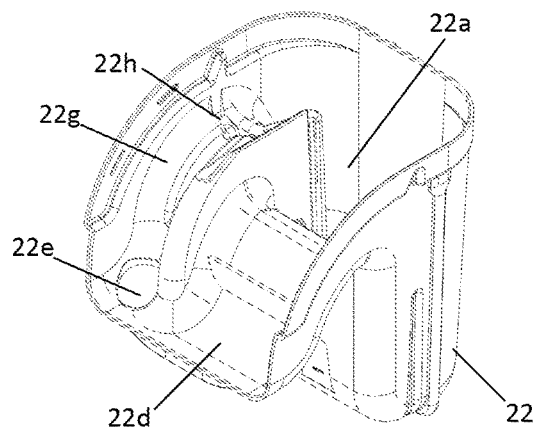
FIG. 12 is a front top perspective view of a filter housing of the filter arrangement shown in FIG. 1.
Figure 13:
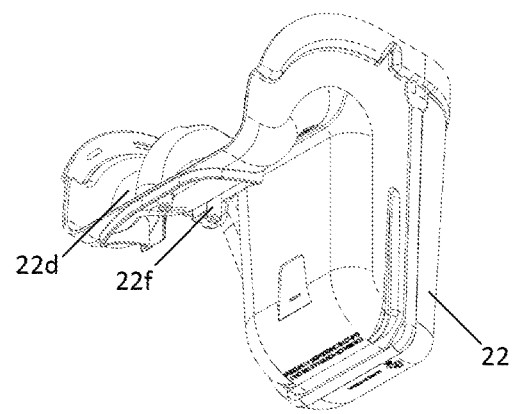
FIG. 13 is a bottom rear perspective view of the filter housing shown in FIG. 12.
Figure 14:
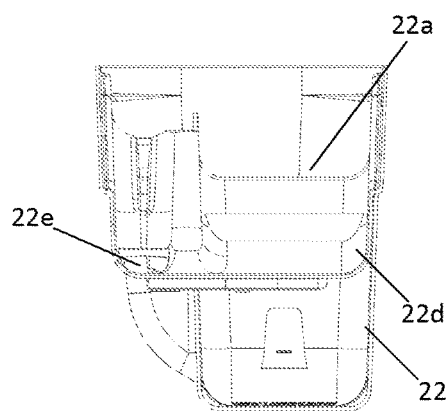
FIG. 14 is a front view of the filter housing shown in FIG. 12.
Figure 15:
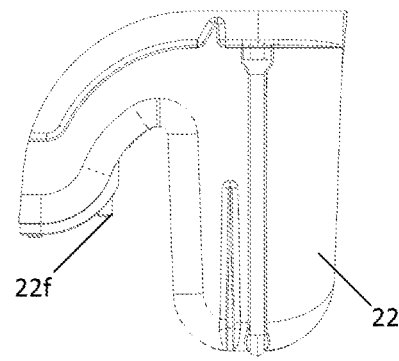
FIG. 15 is a side view of the filter housing shown in FIG. 12.
Figure 16:
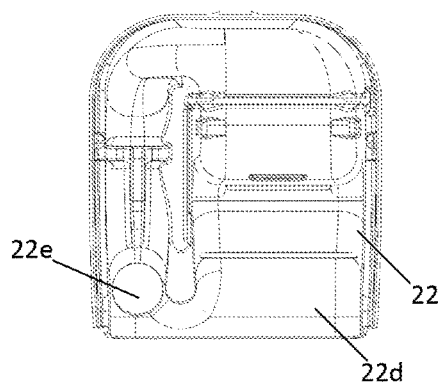
FIG. 16 is a top view of the filter housing shown in FIG. 12.
Figure 17:
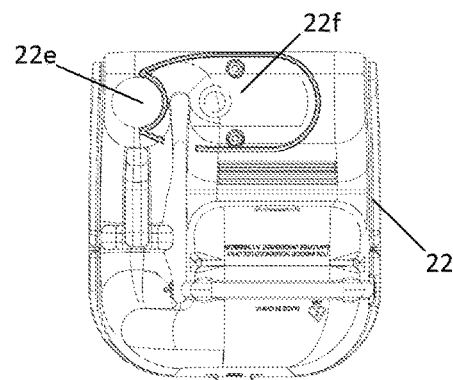
FIG. 17 is a bottom view of the filter housing shown in FIG. 12.
Figure 18:
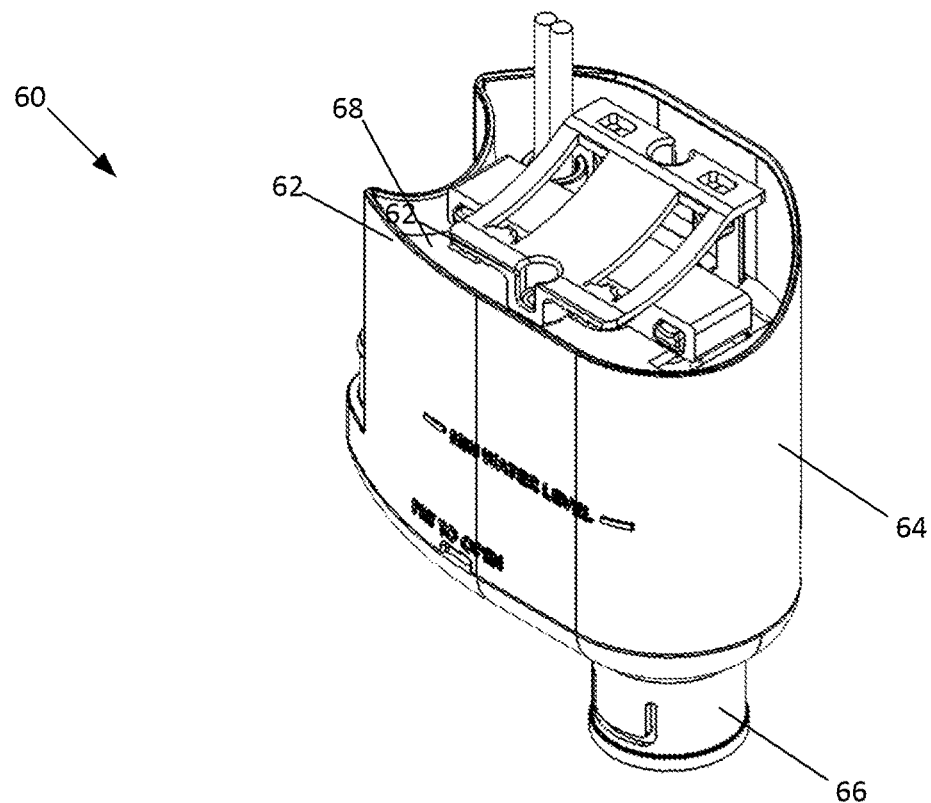
FIG. 18 is a front top perspective view of a pump assembly of the filter arrangement shown in FIG. 1.
Figure 19:
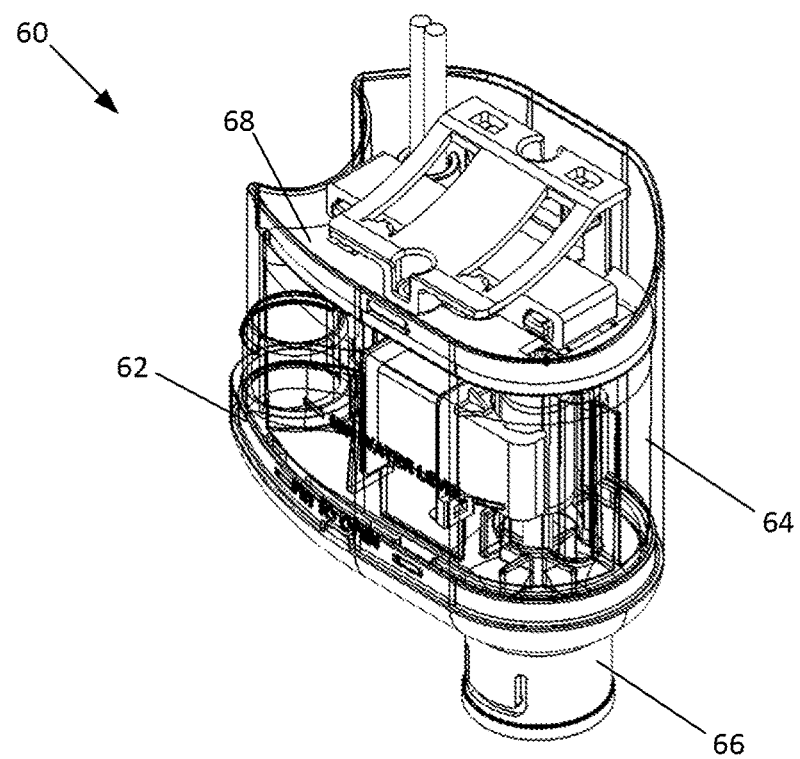
FIG. 19 is a front top perspective view of the pump assembly shown in FIG. 18, with a first housing part of the pump assembly shown as being transparent.
Figure 20:
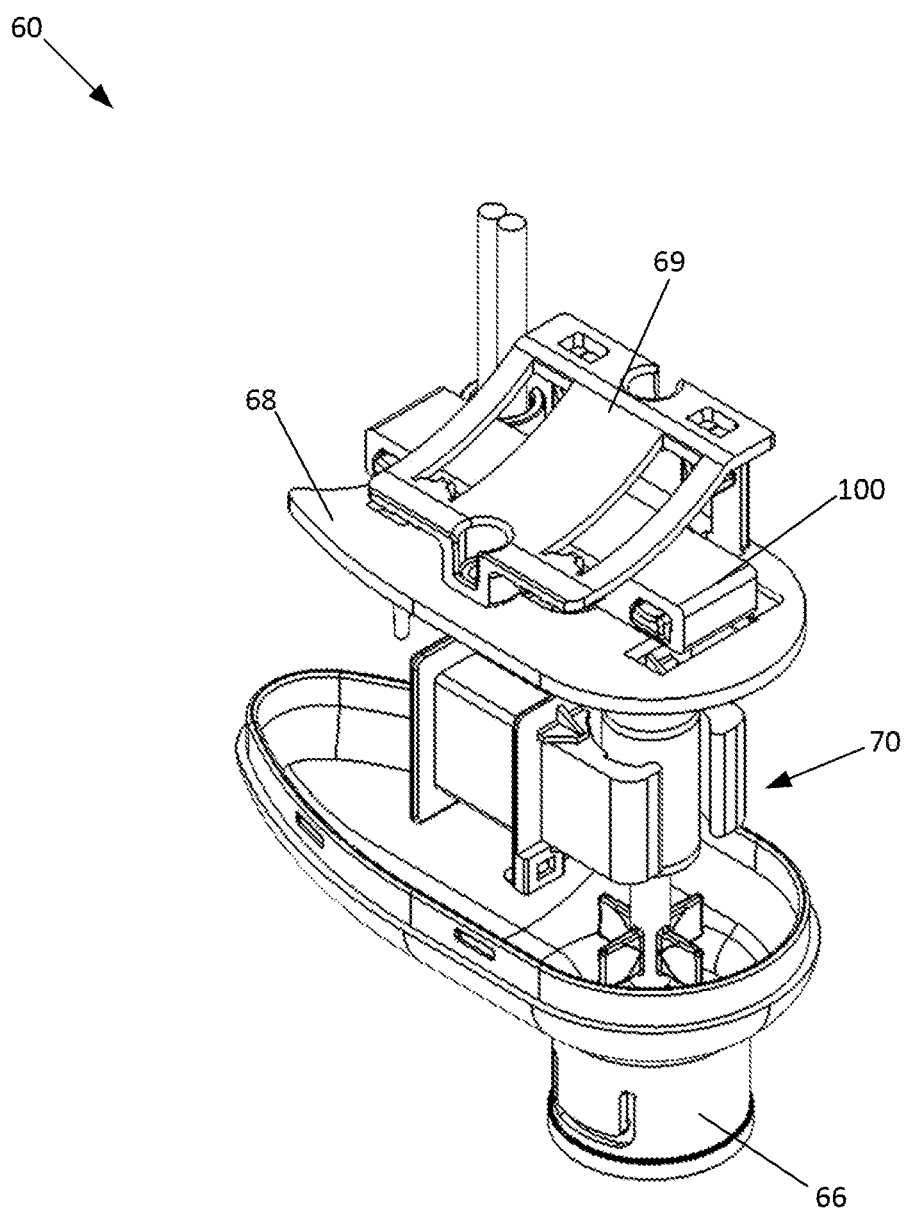
FIG. 20 is a front top perspective view of the pump assembly shown in FIG. 18, with a first housing part of the pump assembly shown as being removed.
Figure 21:
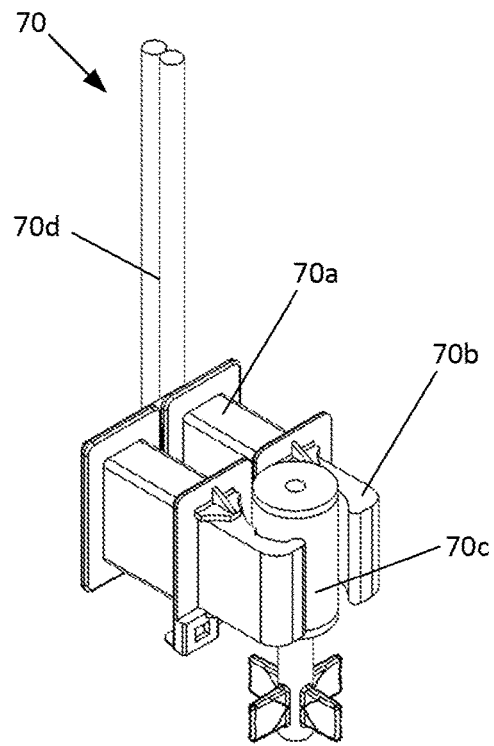
FIG. 21 is a top front perspective view of a pump impeller assembly of the pump assembly shown in FIG. 18.
Figure 22:
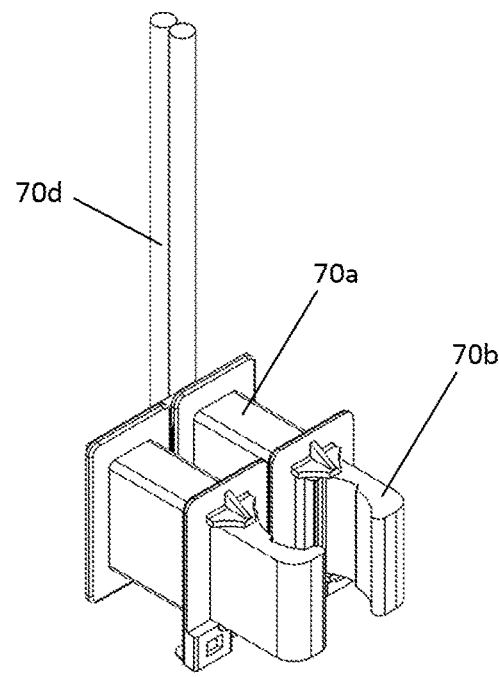
FIG. 22 is a top perspective view of the pump impeller assembly shown in FIG. 21, with the impeller portion removed.
Figure 23:
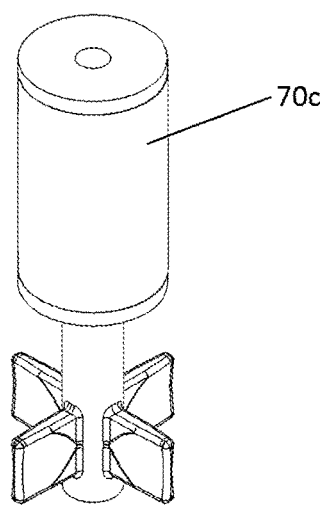
FIG. 23 is a top perspective view of the impeller portion of the pump impeller assembly shown in FIG. 21.
Figure 24:
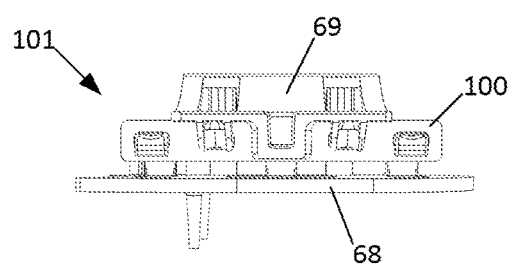
FIG. 24 is a front view of a dampening structure of the pump assembly shown in FIG. 21.
Figure 25:
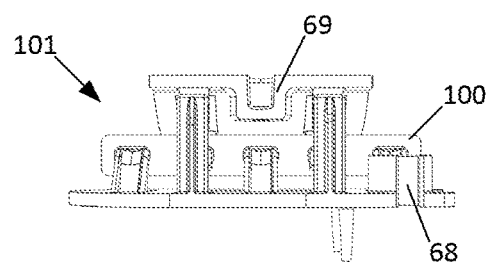
FIG. 25 is a rear view of the dampening structure shown in FIG. 24.
Figure 26:
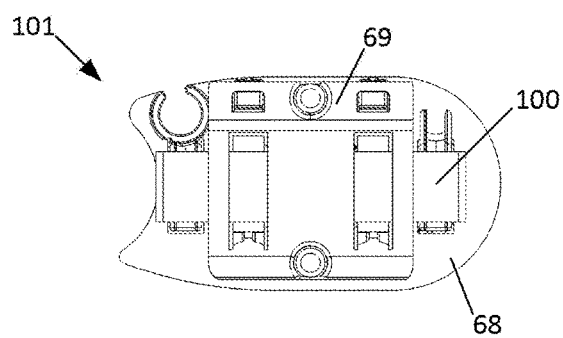
FIG. 26 is a top view of the dampening structure shown in FIG. 24.
Figure 27:
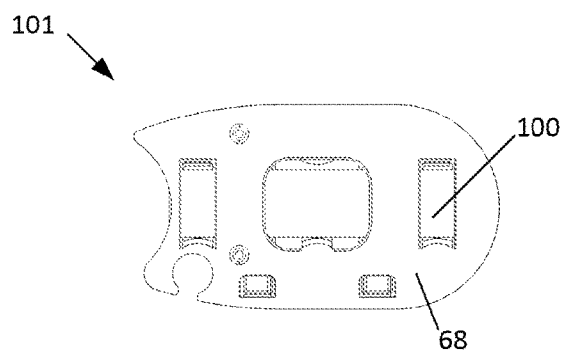
FIG. 27 is a bottom view of the dampening structure shown in FIG. 24.
Figure 28:
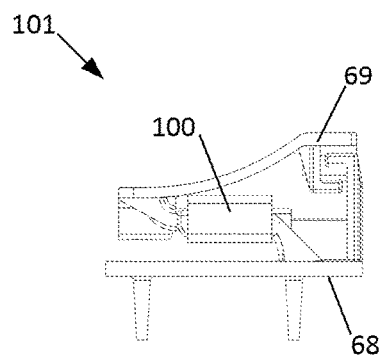
FIG. 28 is a first side view of the dampening structure shown in FIG. 24.
Figure 29:
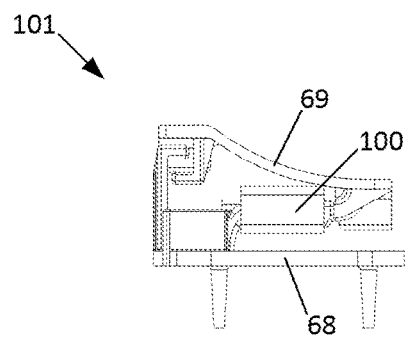
FIG. 29 is a second side view of the dampening structure shown in FIG. 24.
Figure 30:
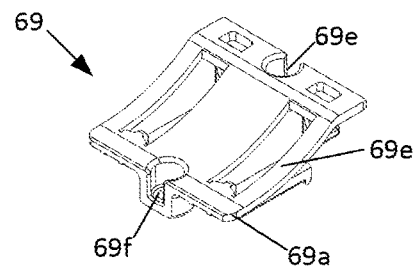
FIG. 30 is a first perspective view of an cover member of the dampening structure shown in FIG. 24.
Figure 31:
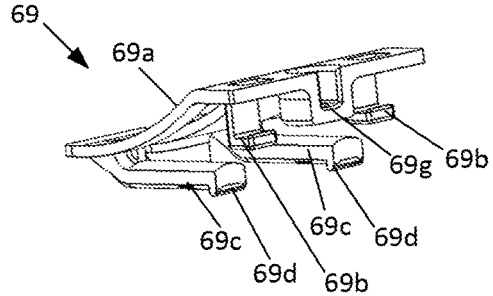
FIG. 31 is a second perspective view of the cover member shown in FIG. 30.
Figure 32:
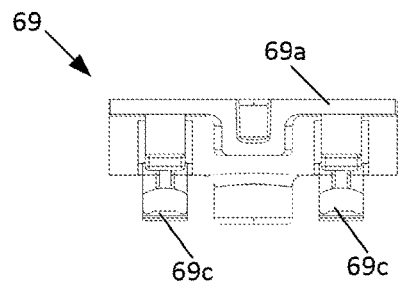
FIG. 32 is a front view of the cover member shown in FIG. 30.
Figure 33:
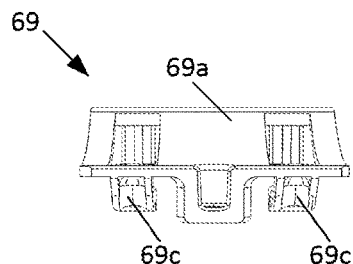
FIG. 33 is a rear view of the cover member shown in FIG. 30.
Figure 34:
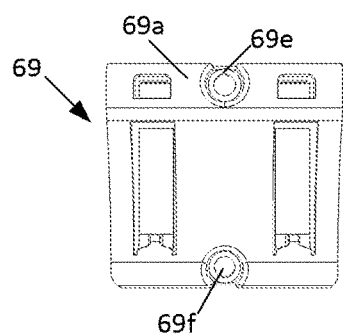
FIG. 34 is a top view of the cover member shown in FIG. 30.
Figure 35:
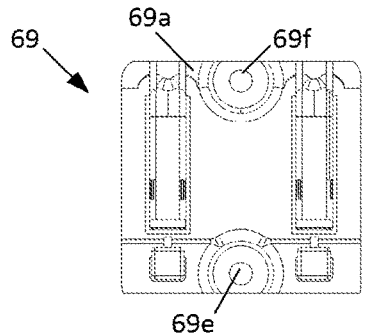
FIG. 35 is a bottom view of the cover member shown in FIG. 30.
Figure 36:
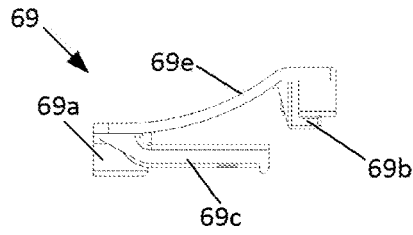
FIG. 36 is a first side view of the cover member shown in FIG. 30.
Figure 37:
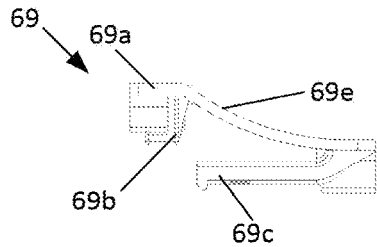
FIG. 37 is a second side view of the cover member shown in FIG. 30.
Figure 38:
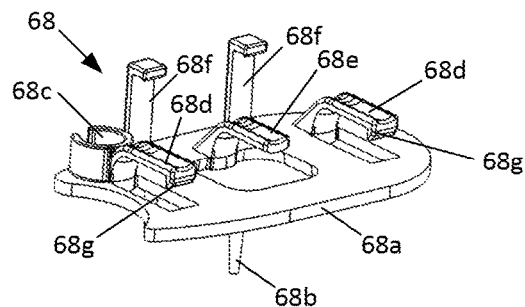
FIG. 38 is a first perspective view of a motor cover of the dampening structure shown in FIG. 24.
Figure 39:
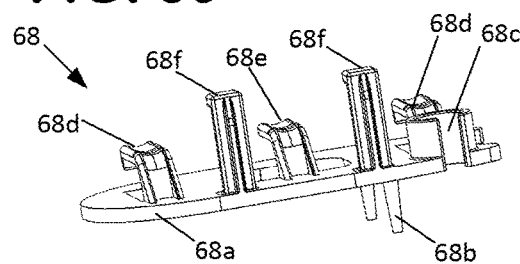
FIG. 39 is a second perspective view of the motor cover shown in FIG. 38.
Figure 40:
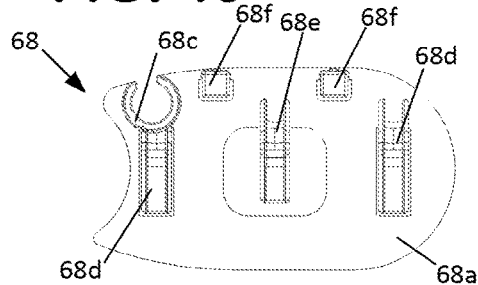
FIG. 40 is a front view of the motor cover shown in FIG. 38.
Figure 41:
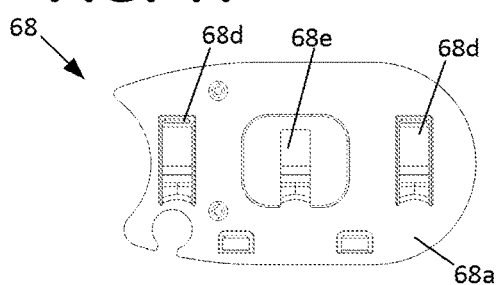
FIG. 41 is a rear view of the motor cover shown in FIG. 38.
Figure 42:
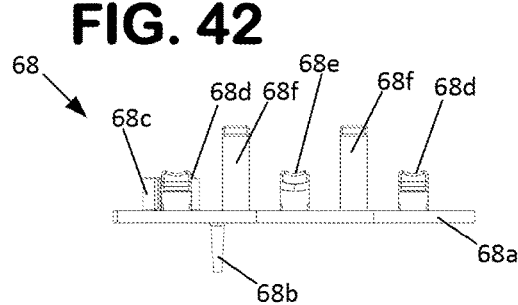
FIG. 42 is a top view of the motor cover shown in FIG. 38.
Figure 43:
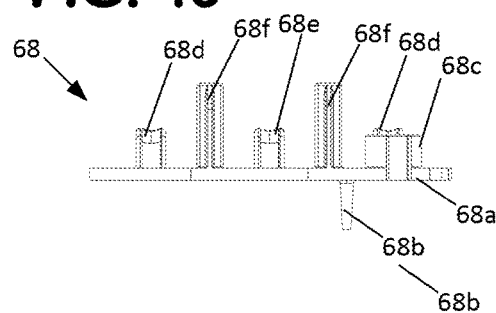
FIG. 43 is a bottom view of the motor cover shown in FIG. 38.
Figure 44:
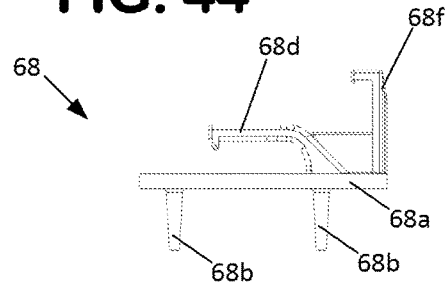
FIG. 44 is a first side view of the motor cover shown in FIG. 38.
Figure 45:
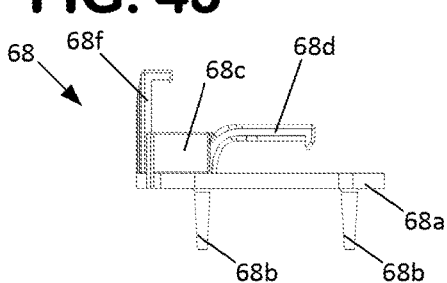
FIG. 45 is a second side view of the motor cover shown in FIG. 38.

As most easily seen at FIG. 9, the filter housing assembly 20 includes a housing 22, a filter cartridge 24, a bio-plate structure 26, and a removable cover 28 for accessing the interior of the housing 22. The housing 22 defines a filter chamber 22a within the filter cartridge 24 and bio-plate structure 26 are disposed. Once installed, the filter cartridge 24 divides the filter chamber 22a of the housing 22 into an intake chamber 22b and a discharge chamber 22c, as can be most easily viewed at FIG. 7. Water flow from the pump assembly 60 is directed into the intake chamber 22b via a transfer tube 82 the transfer tube assembly 80. The water then passes through the filter cartridge 24 and into the discharge chamber 22c. Once the water level in the discharge chamber 22c reaches a sufficient height, the filtered water spills over a spillway 22d. The spillway 22d of the filter arrangement 10 is constructed to mount over an edge 12a of the aquarium 12 so that the filtered water is directed back into the aquarium. As can be seen at FIGS. 12-17, the housing 22 also includes an aperture 22e for receiving the transfer tube 82. The housing 22 additionally includes a receiving arrangement 22f for enabling connection between the housing 22 and the pump assembly 60, discussed later.

Intake Tube Assembly 40

Referring to FIGS. 1-6, 11, and 94-95, the intake tube assembly 40 is shown in greater detail. In one aspect, the intake tube assembly 40 connects to a sidewall 66c of the pump assembly second housing part 66 (discussed later) in a snap-fit manner such that water at a selected height range within the aquarium 12 can be drawn into the pump assembly 60. As shown, the intake tube assembly 40 includes a main tube 42, an extension tube 44, and a strainer tube 46. The strainer tube 46 is connected to the extension tube in a snap-fit manner and includes a plurality of openings 46a through which water can pass into the interior of the tube 46. The extension tube 44 is slidably connected to the main tube 42 via respective cooperating features 42a, 44a on the main tube 42 and extension tube 44. In the example shown, feature 42a includes a deflectable rib or protrusion and features 44a are circumferential grooves which can receive the rib or protrusion 42a such that the height of the strainer tube 46 can be positively indexed at a desired height within the aquarium 12.

Pump Assembly 60

Referring to FIGS. 10-36 details of the pump assembly 60 and first dampening structure 100 are shown. In the examples presented, the filter housing assembly 20 and the pump assembly 60 are separate assemblies that are connected to each other via the dampening structure 100. This arrangement allows for vibration and sounds generated by the pump assembly 60 to be isolated from the filter housing assembly 20. As the filter housing assembly 20 is directly mounted to the aquarium 12, the dampening structure 100 thus isolates vibration and sound generated by the pump assembly 60 from being transmitted to the filter housing assembly 20 and aquarium walls 12.

In one aspect, the pump assembly 60 includes a housing 62 formed by interconnected first and second housing parts 64, 66. The first and second housing parts 64, 66 can be connected together via a snap-fit type connection, or by other means such as by an adhesive or mechanical fasteners.

The first housing part 64 includes a bottom wall 64a from which a sidewall 64b extends to define a first interior cavity 64c. The first housing part 64 further includes an interior sidewall 64d and interior end wall 64e that defines a second interior cavity 64f within the interior cavity 64c. The first housing part 64 additionally includes an exterior sidewall 64g which extends through the bottom wall 64a to an open end 64h to form an exit passageway 64i. In one aspect, the interior cavity 64c of the first housing part 64 can be filled with an epoxy material to secure the magnetic drive components and related electrical components of the pump 70, discussed later.

The second housing part 66 is defined by a first sidewall 66a defining an interior cavity 66b and a second sidewall 66c defining an inlet passageway 66d into the interior cavity 66b. The second sidewall 66c is configured to connect with the intake tube assembly 40. When the first and second housing parts 64, 66 are connected together, the second interior cavity 64f of the first housing part 64 opens into interior cavity 66b of the second housing part 66. Additionally, the passageway 64h defined by the sidewall 64f is also open to the interior cavity 66b of the second housing part such that a passageway is defined from the intake tube assembly 40, through the interior cavity 66b, through the exit passageway 64i, and into the transfer tube assembly 80 where water from the aquarium 80 can be delivered to the housing intake chamber 22b.

The pump assembly 60 includes a pump 70 including a bracket 70a supporting a magnetic drive part 70b, a coil (not shown), and an impeller magnet part 70c. The impeller magnet part 70c is coupled to an impeller 70e such that when the impeller magnetic part 70c rotates, the impeller 70e rotates as well. Electrical leads 70d extend to the control part 70a such that the magnetic drive part 70b can be powered to drive the impeller via the impeller magnet part 70c.

As shown, the electrical leads 70d, the bracket 70a, and the magnetic drive part 70b are housed within the first interior cavity 64c while the impeller magnet part 70c is housed within the second interior cavity 64e, with the impeller extending into the interior cavity 66b of the second housing part. Thus, when the magnet drive part 70b is powered, the impeller 70e rotates to draw fluid from the aquarium 80 and into the intake tube assembly 40, through the interior cavity 66b, through the exit passageway 64i, and into the transfer tube assembly 40.

In one aspect, a cover member 68 can be provided to enclose the interior cavity 64c of the first housing part 64 within which the pump assembly 60 is disposed. The cover member 68 is shown in isolation at FIGS. 38-45. In the example shown, the cover member 68 is connected to the first housing part 64 via the epoxy filled into the interior cavity 64c. The cover member 68 can be connected to the first housing part 64 by other types of connections, for example a snap-fit type connection. As shown, the cover member 68 includes a base member 68a that has a perimeter profile that generally matches the perimeter profile of the first housing part 64 such that the cover part generally encloses the top of the interior cavity 64c. The cover member 68 can be provided with one or more projections or extensions 68b that extend into the interior cavity to allow the epoxy to more securely engage with and retain the cover member 68. The cover member 68 can also be provided with a collar or aperture 68c for allowing electrical leads 70d of the pump assembly 60 to extend out of the interior cavity 64c.

The cover member 68 is also shown as being provided with a plurality of support arms 68d, 68e, 68f that enable connection to a mounting member 69 via a dampening member 100. The mounting member 69 is directly coupled to the filter housing assembly 20 while the dampening member 100 reduces and/or eliminates vibrations and sounds generated by the pump assembly 60 from being transmitted to the filter housing assembly 20. Collectively, the cover member 68, the mounting member 69, and the dampening member 100 function as a dampening structure/assembly and connection mechanism for coupling the pump assembly 60 to the filter housing assembly 20. Thus, these components may be referred to as an independent dampening assembly 101 or as a dampening subassembly of the pump assembly. This assembly or subassembly 101 is shown in isolation at FIGS. 24-29. The vibration and sound dampening functionality of the dampening assembly or subassembly is an improvement over prior art designs in which the pump assembly and filter housing assembly are constructed as a single assembly which leaves little or no opportunity for incorporating vibration isolation measures.

As shown, a pair of support arms 68d is provided which extend up from the base member 68a and then extend in a direction parallel to the base member 68a. As such, the support arms 68d can be characterized as having an L-shape or a bent shape. The support arms 68d further include hook or retaining portions 68g that extend down towards the base member 68a and function to retain the dampening member 100 on the support arms 68d once the dampening member 100 is installed onto the arms 68d. A third support arm 68e is provided between the support arms 68d and similarly extends up from the base member 68a and then parallel to the base member 68a, but without having a hook or retaining portion 68g.

The support arms 68f of the cover member 68 similarly extend up from the base 68a, but to a larger extent with a relatively shorter portion extending in a direction parallel to the base 68a. The support arms 68f are also provided with a hook or retaining portion 68h. Unlike the support arms 68d and 68e, the support arms 68f are configured to engage with corresponding L-shaped or bent support arms 69b of the mounting member 69 if necessary, but are normally spaced from the support arms 69b such that sound and vibration transmission directly from the cover member 68 to the mounting member 69 does not occur.

Figure 51:
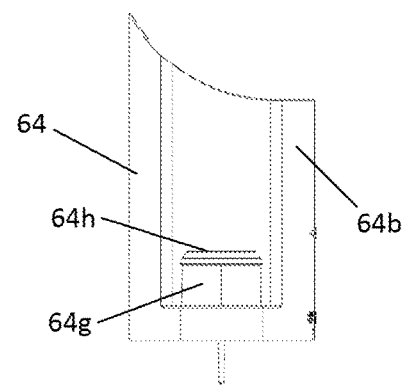
FIG. 51 is a side view of the first housing part shown in FIG. 48.
Figure 52:
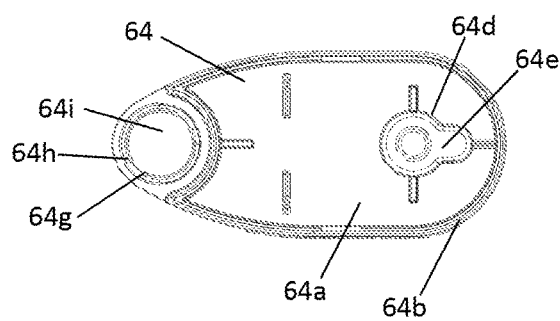
FIG. 52 is a top view of the first housing part shown in FIG. 48.
Figure 53:
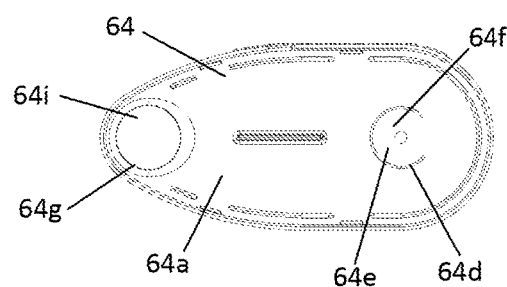
FIG. 53 is a bottom view of the first housing part shown in FIG. 48.
Figure 54:
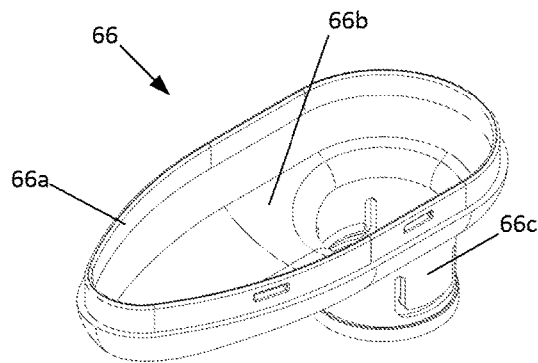
FIG. 54 is a first perspective view of a second housing part of the pump assembly shown in FIG. 18.
Figure 55:
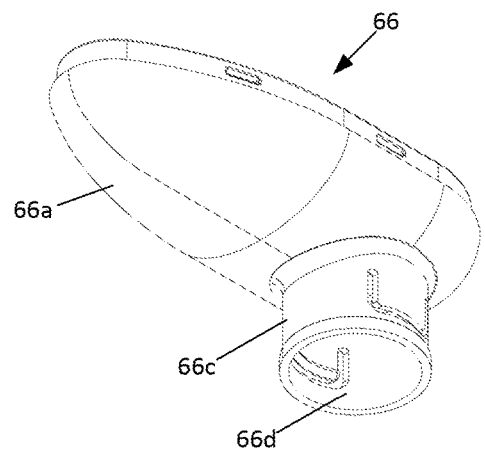
FIG. 55 is a second perspective view of the second housing part shown in FIG. 54.
Figure 56:
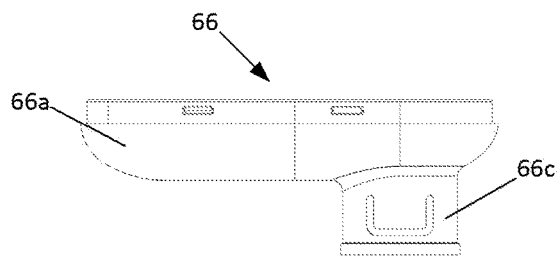
FIG. 56 is a front view of the second housing part shown in FIG. 54.
Figure 57:
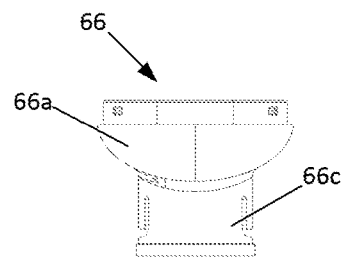
FIG. 57 is a side view of the second housing part shown in FIG. 54.
Figure 58:
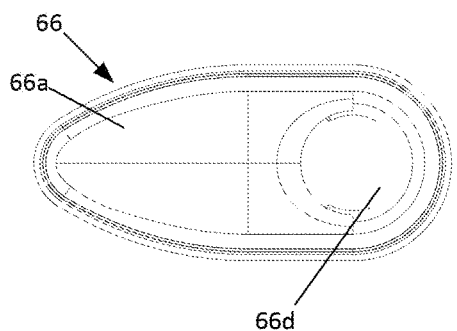
FIG. 58 is a top view of the second housing part shown in FIG. 54.
Figure 59:
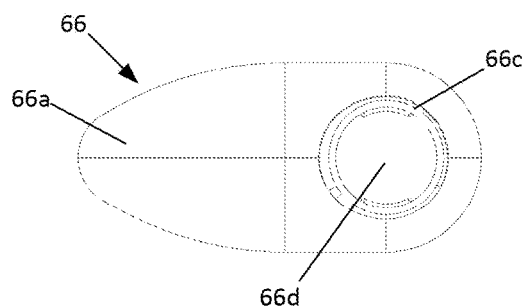
FIG. 59 is a bottom view of the second housing part shown in FIG. 54.

Referring to FIGS. 30-37, the mounting member 69 is shown in isolation. As shown, the mounting member 69 is unitarily formed with a base member 69a, the aforementioned support arms 69b, and with an additional pair of support arms 69c. The support arms 69c extend down from the base member 69a and then extend in a direction parallel to the base member 68a of the cover member 68 such that the support arms 69c are parallel to the support arms 68d, 68e. As such, the support arms 69c can be characterized as having an L-shape or a bent shape. The support arms 69c further include hook or retaining portions 69d that extend down and away from the base member 69a and function to retain the dampening member 100 on the support arms 69c once the dampening member 100 is installed onto the arms 69c. In one aspect, the base member 69a defines a mounting surface 69e which is formed with a curved shape that is complementary to the shape of the bottom of the housing 22 of the filter housing assembly 20 such that the mounting member 69 can be joined in a flush relationship to the housing 22, as can be most easily seen at FIGS. 7 and 8. The profile of this curve can also be observed at the top edge of the first housing part 64 of the pump assembly 60 (e.g. see FIG. 51) which allows the first housing part 64 to be flush mounted to the housing 22 of filter housing assembly. To facilitate attachment of the mounting member 69 to the housing 22, the mounting member 69 is provided with mounting holes 69f, 69g through which fasteners can extend into the receiving arrangement 22f. Through this connection, the pump assembly 60 is mounted to the filter housing assembly 20, but with vibration from the pump assembly 60 being dampened by the interconnected dampening member 100.

Figure 46:
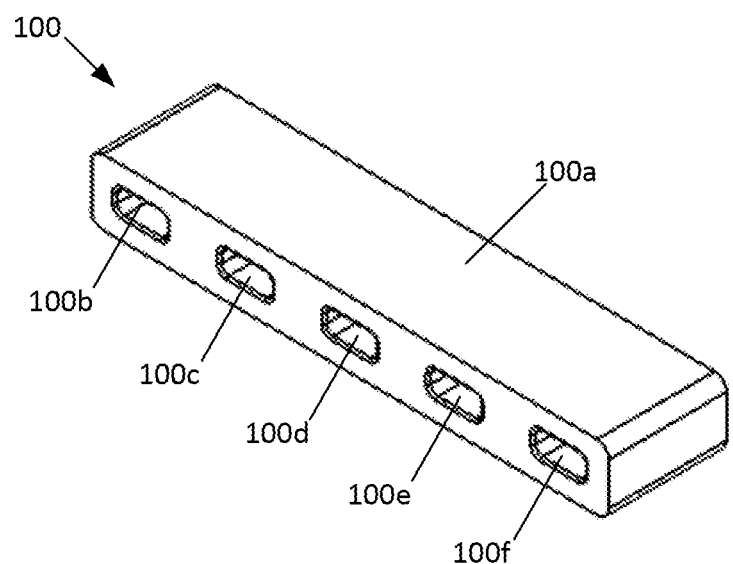
FIG. 46 is a perspective view of a first dampening member of the dampening structure shown in FIG. 24.
Figure 47:
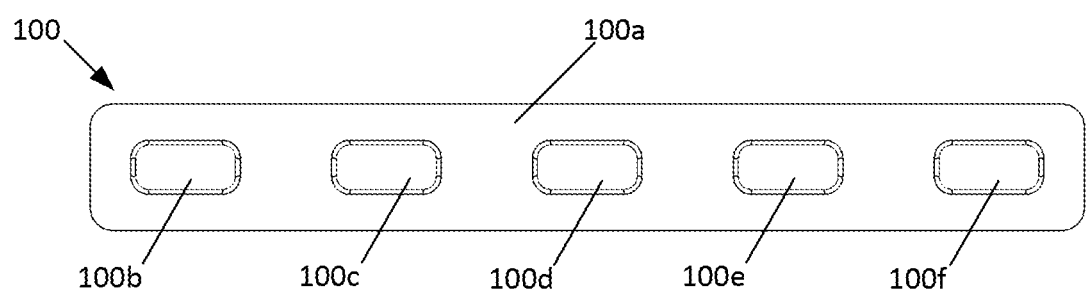
FIG. 47 is a front view of the first dampening member shown in FIG. 46.
Figure 48:
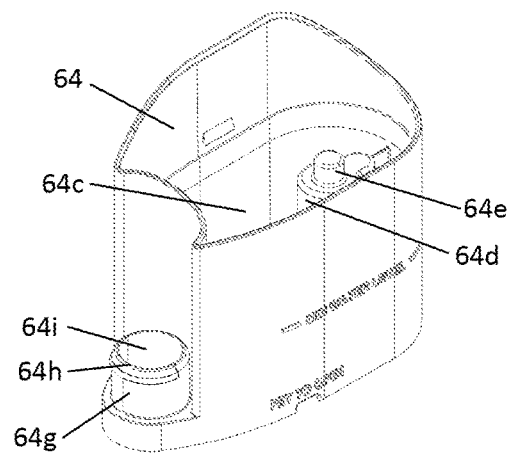
FIG. 48 is a first perspective view of a first housing part of the pump assembly shown in FIG. 18.
Figure 49:
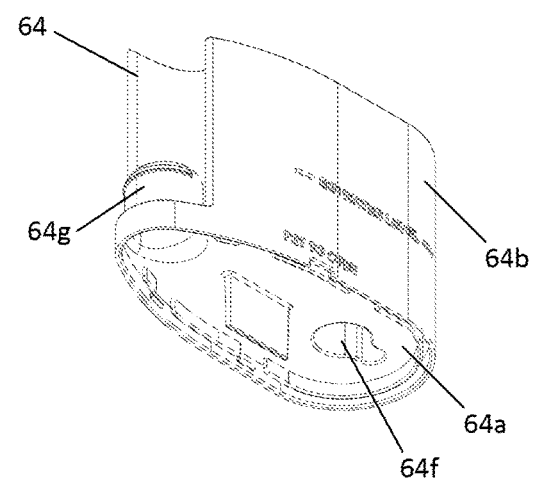
FIG. 49 is a second perspective view of the first housing part shown in FIG. 48.
Figure 50:
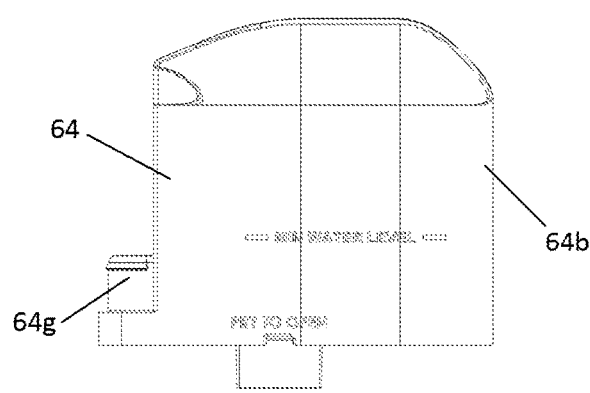
FIG. 50 is a front view of the first housing part shown in FIG. 48.

The dampening member 100 is shown in isolation at FIGS. 46-47. As presented, the dampening member 100 is formed with a unitary construction from an elastomeric or viscoelastic polymeric material, such as plastics, rubbers, silicones, and polyurethanes. In one aspect, the dampening member 100 is provided with a main body 100a having a plurality of openings for receiving the support arms from the cover member 68 and the mounting member 69. For example, the main body 100a is provided with openings 100b and 100f for receiving the support arms 68d and an opening 100d for receiving the support arm 68e. The main body 100a is also provided with openings 100c and 100e for receiving the pair of mounting arms 69b of the mounting member 69. Accordingly, any vibration or sound transmitted to the support arms 68d, 68e from the pump 70 is dampened by the dampening member 100 and is transmitted to a much lesser degree, if at all, to the support arms 69b of the mounting member 69. In the embodiment shown, the opening 100b-100f are generally rectangular in shape (with rounded corners) and extend all the way through the main body 100a. However, different shapes may be utilized, such as circular, triangular, and other polygonal shapes with or without rounded corners. Also, although five total openings are shown, more or fewer openings can be provided depending upon the desired number of support arms extending from the mounting member 69 and cover member 68.

Figure 6:
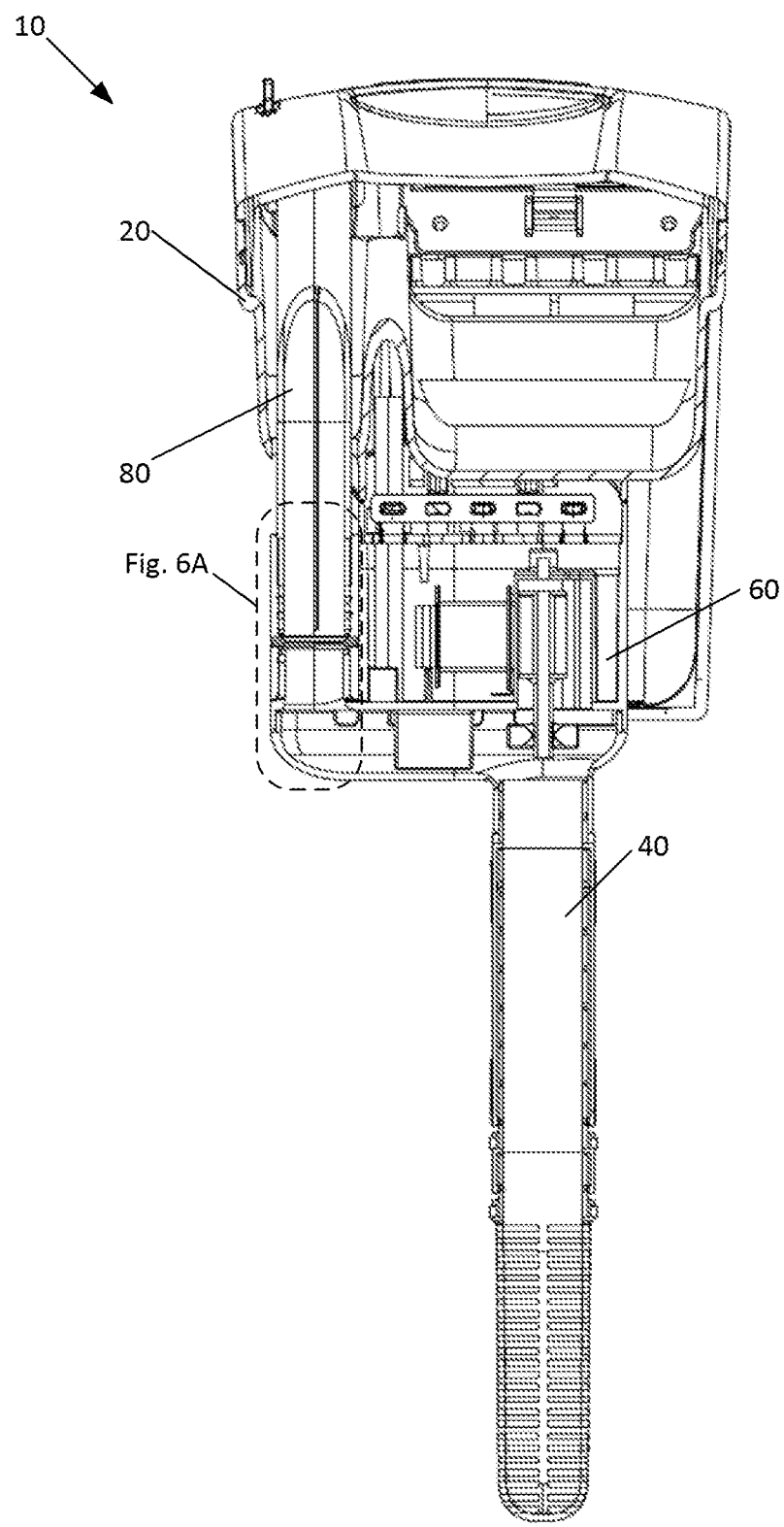
FIG. 6 is a cross-sectional view of the filter arrangement shown in FIG. 1, taken along the line 6-6 in FIG. 3.
Figure 6A:
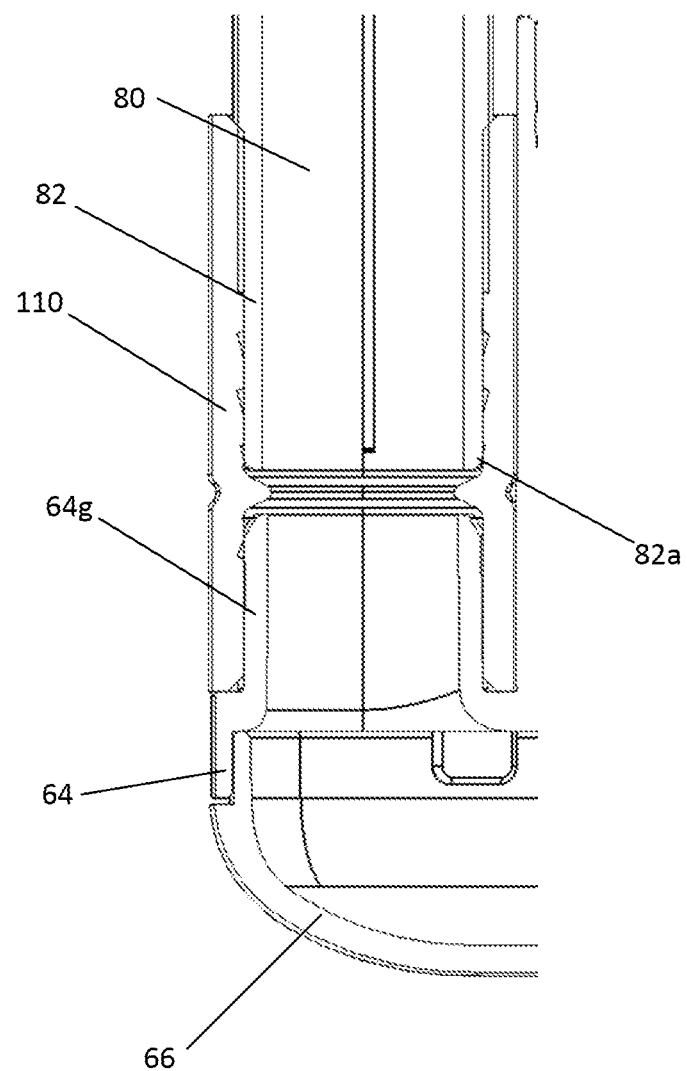
FIG. 6A is an enlarged portion of the view shown in FIG. 6, as indicated at FIG. 6.
Figure 7:
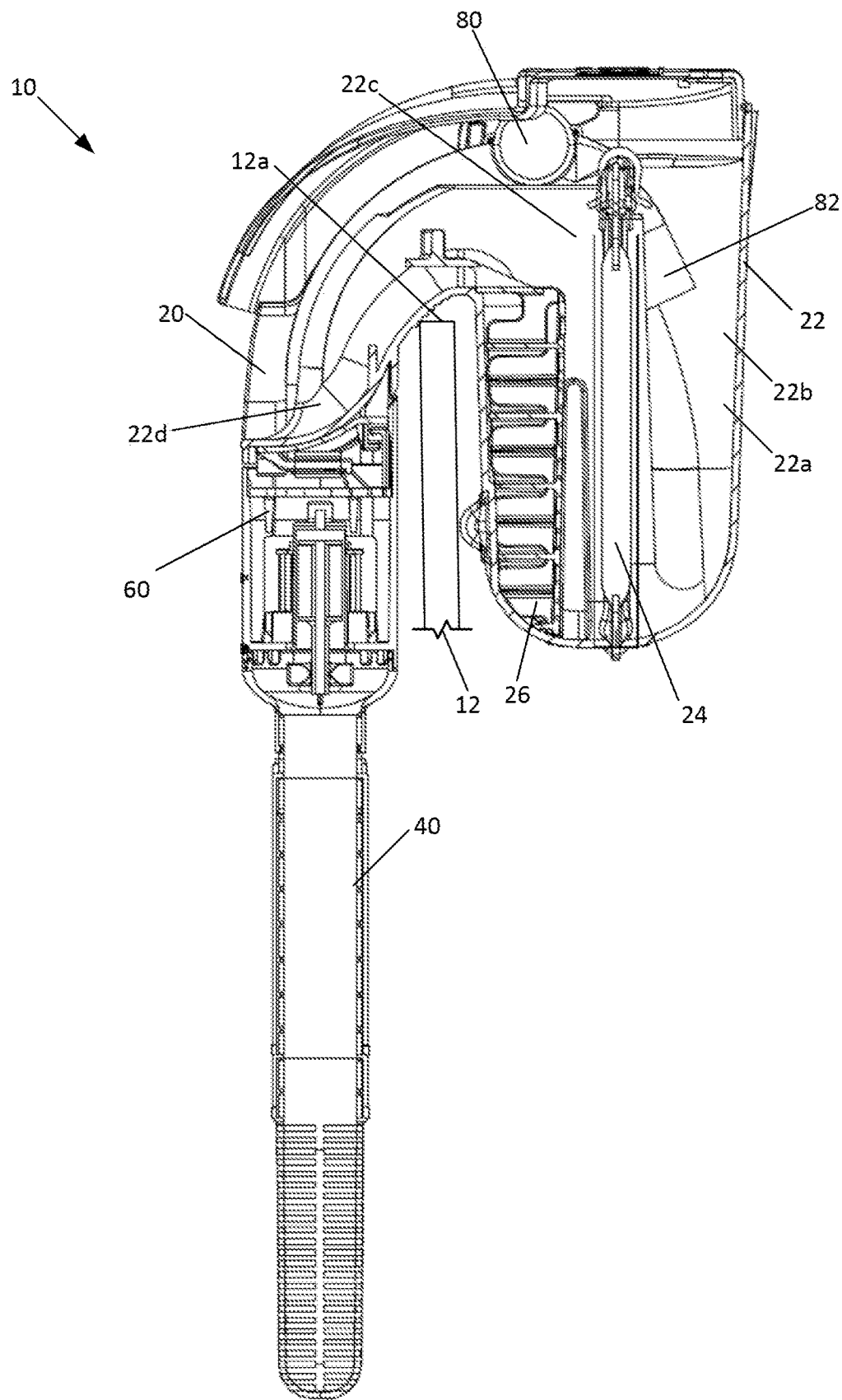
FIG. 7 is a cross-sectional view of the filter arrangement shown in FIG. 1, taken along the line 7-7 in FIG. 5.
Figure 8:
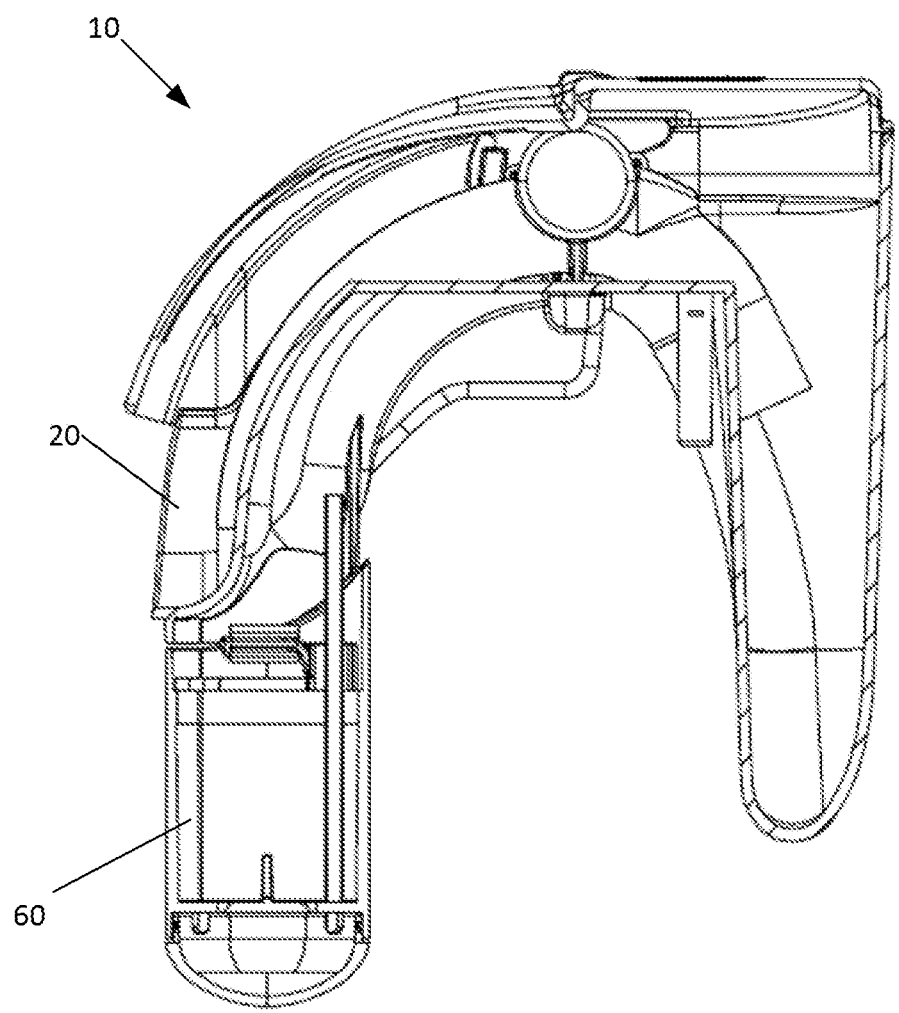
FIG. 8 is a cross-sectional view of the filter arrangement shown in FIG. 1, taken along the line 8-8 in FIG. 5.
Figure 92:
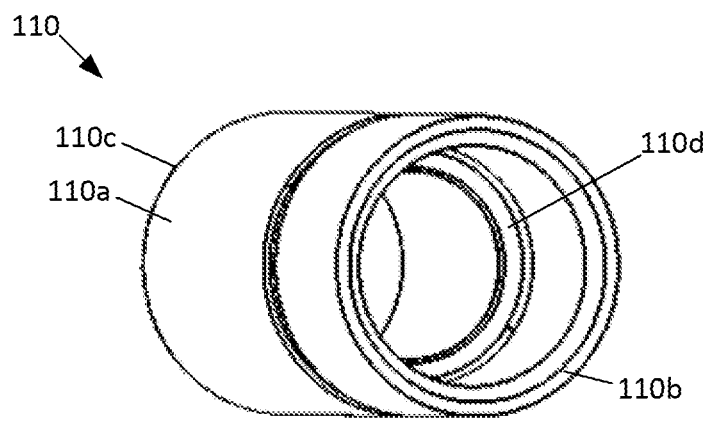
FIG. 92 is a perspective view of a dampening member connecting the transfer tube assembly to the pump assembly first housing part of the filter arrangement shown in FIG. 1.
Figure 93:
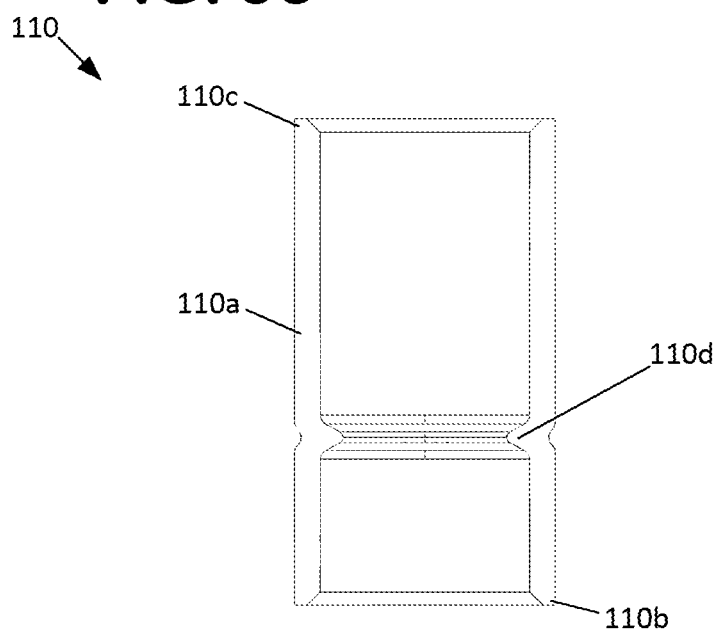
FIG. 93 is a cross-sectional view of the dampening member shown in FIG. 92.
Figure 94:
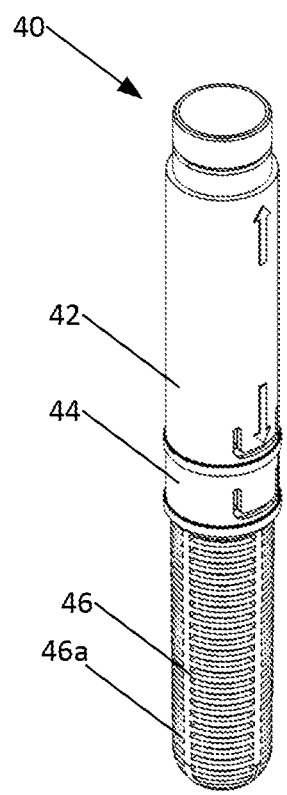
FIG. 94 is a perspective view of an intake tube assembly of the filter arrangement shown in FIG. 1.
Figure 95:
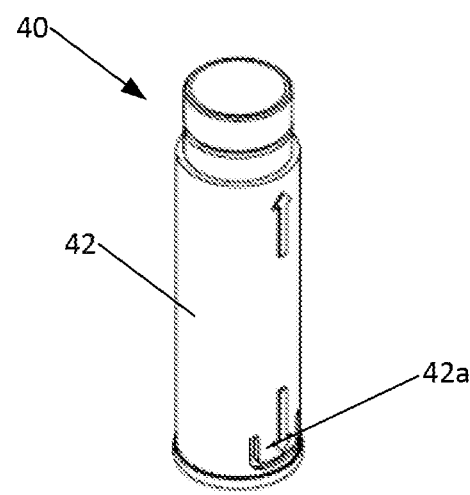
FIG. 95 is an exploded perspective view of the intake tube assembly shown in FIG. 94.
Figure 95:
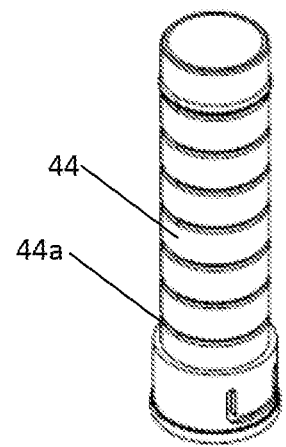
Figure 95:
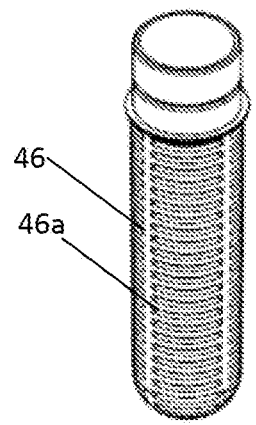

The pump assembly 60 can also be provided with a dampening member 110 to facilitate the connection between the pump assembly 60 and the transfer tube assembly 80. As presented, the dampening member 110 is formed with a unitary construction from an elastomeric or viscoelastic polymeric material, such as plastics, rubbers, silicones, and polyurethanes. As described earlier, the first housing part 64 of the pump assembly 60 includes an exterior sidewall 64g which extends through the bottom wall 64a to an open end 64h to form an exit passageway 64i. This structure essentially forms a pumped fluid outlet opening to which the inlet end 82a of a tube structure 82 (discussed later) of the transfer tube assembly 80 can be connected via the dampening member 110, as can most easily be seen at FIG. 6A. The dampening member 110 is shown in isolation at FIGS. 92-93 where it can be seen that the dampening member 110 is a tubular structure with a sidewall 110a extending from a first open end 110b to a second open end 110c. The sidewall 110a frictionally engages the sidewall 64g at the first open end 110b and the tubular structure inlet end 82a at the second open end 110c. The seals formed between the sidewall 110a and the sidewall 64g and tubular structure 82 may be further formed with a sealant, such as silicone or may be further effectuated mechanically, such as with a band.

In one aspect, the dampening member 110 includes an internal circumferential flange 110d which extends radially inwardly from the sidewall 110a. The circumferential flange 110d extends sufficiently inwardly such that the end of the sidewall 64g and the inlet end 82a of the tube structure are prevented from abutting each other, and thus transmitting sound and vibration from the pump assembly 60 to the transfer tube assembly 80. Instead, the end of the sidewall 64g and the inlet end 82a of the tube structure 82 each abuts the internal circumferential flange 110d where these components are inserted into the dampening member 110 to such a degree.

Taken together, the dampening members 100 and 110 operate to reduce or prevent the transmission of sound and vibration from the pump assembly 60 to the downstream related components (e.g. housing assembly 20, transfer tube assembly 80) of the filtration arrangement 10 and thus ultimately reduce or prevent sound and vibration from being transmitted to the aquarium 12 where the sound and vibration can be further amplified.

Transfer Tube Assembly 80

Referring to FIGS. 6-11 and 60-91, features of the transfer tube assembly 80 are shown in greater detail. In one aspect, the transfer tube assembly 80 includes an arc-shaped tube structure 82 extending between an inlet end 82a and an outlet end 82b. The tube structure 82 is primarily situated within the housing 22 and rests within a concave-shaped support channel 22g defined within the housing 22. The inlet end 82a of the tube structure 82 extends through the aperture 22e of the housing 22 and is connected to the pump assembly exterior sidewall 64g via a dampening structure 100 (discussed later). The tube structure 82 is oriented within the housing 22 such that the second end 82b extends into the intake chamber 22b of the housing 22, as most easily viewed at FIG. 7. Thus, the tube structure 82 allows for water pumped by the pump assembly 60 to be delivered to the intake chamber 22. The tube structure 82 additionally defines a valve cavity 82d for housing a valve assembly 90 (discussed later) and a support structure 82c to which dampening structures 300 (discussed later) are attached.

In one aspect, the tube structure 82 is formed by a first tube half 84 and a second tube half 86 mated to the first tube half 84. The tube halves 84, 86 can be bonded to each other by a variety of means, such as by sonic welding. Each tube half 84, 86 extends between a first end 84a, 86a and a second end 84b, 86b. Additionally, the tube half 84 includes a cylindrical sidewall portion 84c and the tube half includes a cavity portion 86c that cooperatively define the valve cavity 82d. The valve cavity 82d retains the valve body 92 of a valve assembly 90, discussed later. The tube halves 84, 86 are also provided with a recessed area 84f, 86f that together form a recessed portion 82d within which a valve member 92f of the valve body 92 resides when the valve assembly 90 is in an open position.

In one aspect, the tube half 84 is shown as including a pair of alignment apertures 84e while the tube half 86 is shown as including a pair of alignment protrusions 86e that are received into the apertures 86e. These features ensure that the tube halves 84, 86 are properly aligned to each other prior to being bonded together and also aid in initial alignment during assembly. As shown, the apertures 84e and protrusions 86e are located proximate the valve cavity 82c where proper alignment is generally more important. The apertures and protrusions 84e, 86e can also impart additional structural integrity to the tube structure 82. Other numbers, locations, and combinations of apertures and protrusions may be provided on the tube halves 84, 86 to ensure alignment. Also, other alignment features may be utilized such as elongated slots or grooves that receive cooperatively shaped protrusions.

Figure 65:
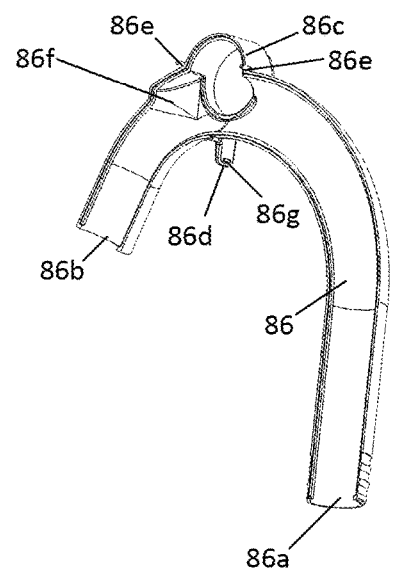
FIG. 65 is a perspective view of a second tube half of the transfer tube assembly shown in FIG. 60.
Figure 66:
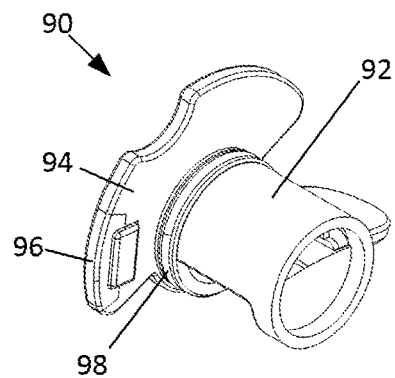
FIG. 66 is a first perspective view of a valve assembly of the transfer tube assembly shown in FIG. 60.
Figure 67:
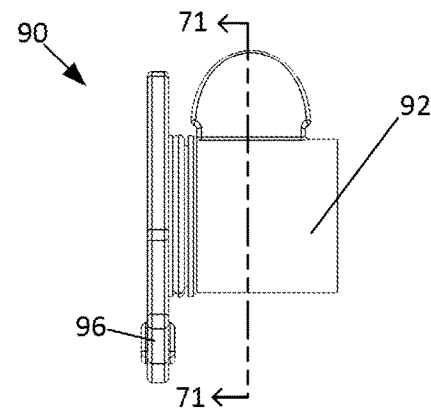
FIG. 67 is a top view of the valve assembly shown in FIG. 66.
Figure 68:
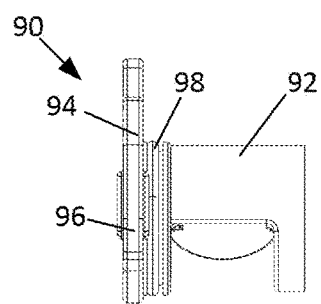
FIG. 68 is a front view of the valve assembly shown in FIG. 66.
Figure 69:
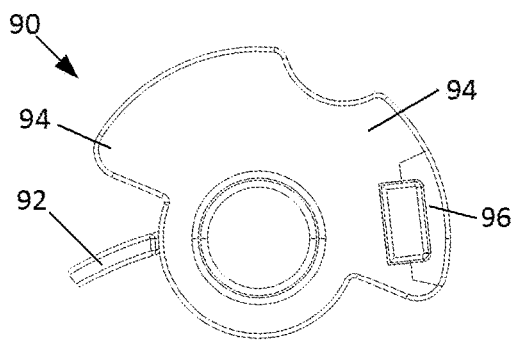
FIG. 69 is a first side view of the valve assembly shown in FIG. 66.
Figure 70:
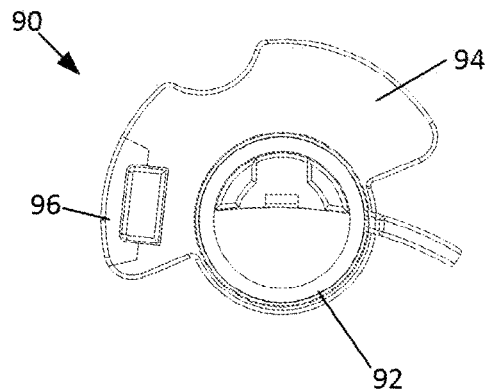
FIG. 70 is a second view of the valve assembly shown in FIG. 66.
Figure 71:
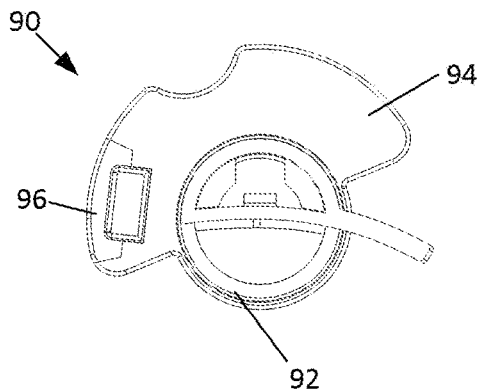
FIG. 71 is a cross-sectional view of the valve assembly shown in FIG. 66, taken along the line 71-71 in FIG. 67.
Figure 72:
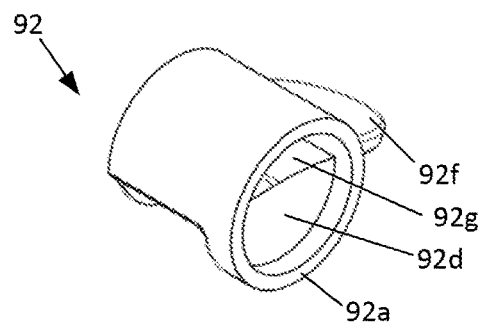
FIG. 72 is a first perspective view of a first valve part of the valve assembly shown in FIG. 66.
Figure 73:
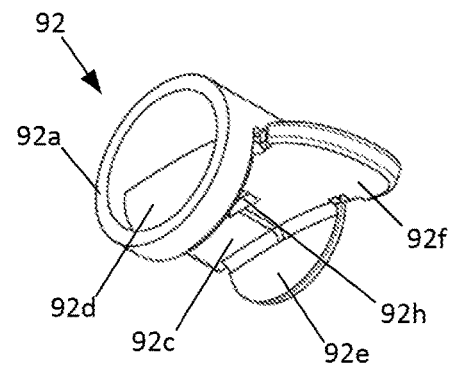
FIG. 73 is a second perspective view of the first valve part shown in FIG. 72.
Figure 74:
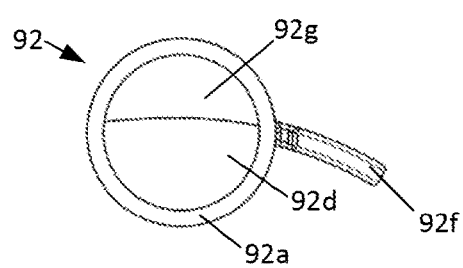
FIG. 74 is a first side view of the first valve part shown in FIG. 72.
Figure 75:
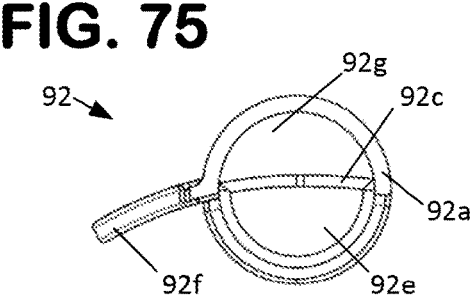
FIG. 75 is a second side view of the first valve part shown in FIG. 72.
Figure 76:
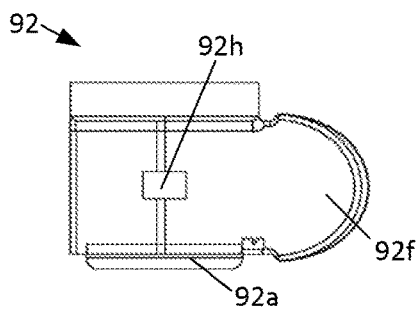
FIG. 76 is a bottom view of the first valve part shown in FIG. 72.
Figure 77:
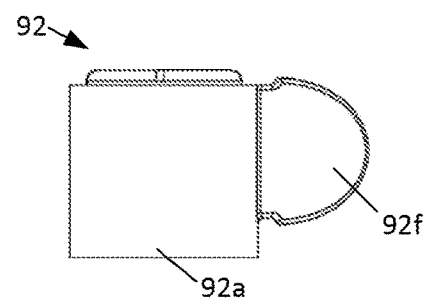
FIG. 77 is a top view of the first valve part shown in FIG. 72.
Figure 78:
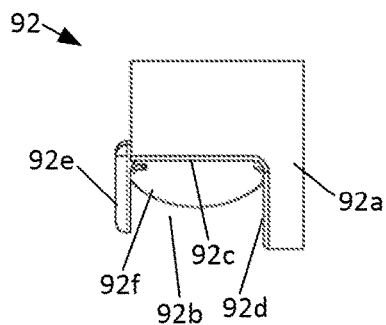
FIG. 78 is a front view of the first valve part shown in FIG. 72.
Figure 79:
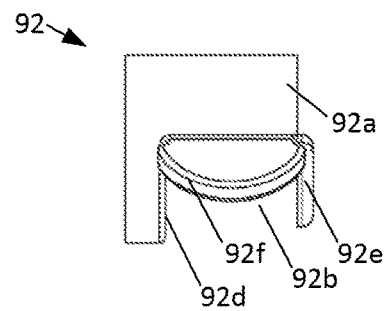
FIG. 79 is a rear view of the first valve part shown in FIG. 72.
Figure 80:
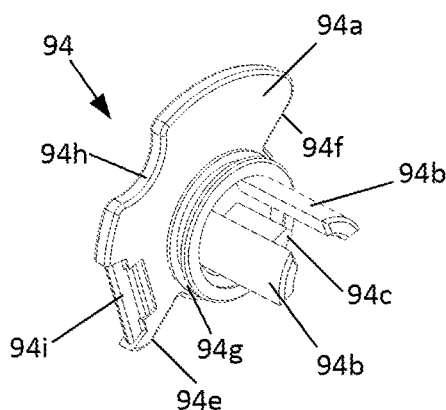
FIG. 80 is a first perspective view of a second valve part of the valve assembly shown in FIG. 66.
Figure 81:
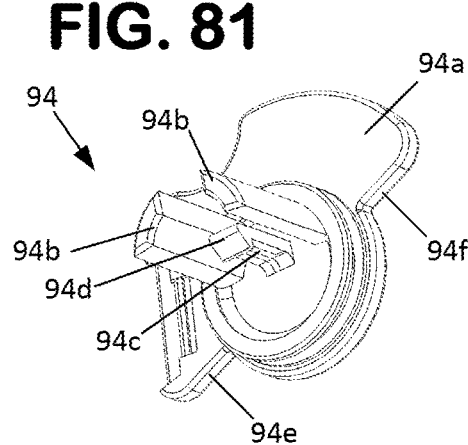
FIG. 81 is a second perspective view of the second valve part shown in FIG. 80.
Figure 82:
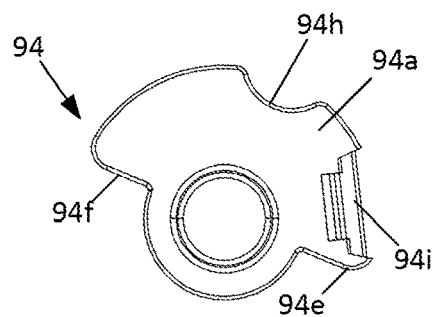
FIG. 82 is a first side view of the second valve part shown in FIG. 80.
Figure 83:
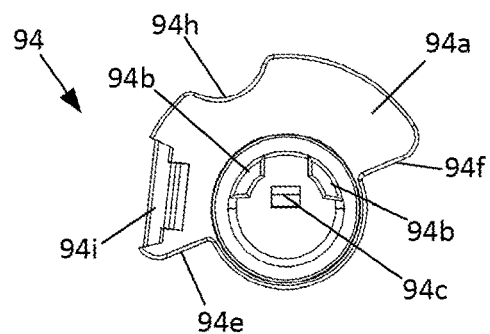
FIG. 83 is a second side view of the second valve part shown in FIG. 80.
Figure 84:
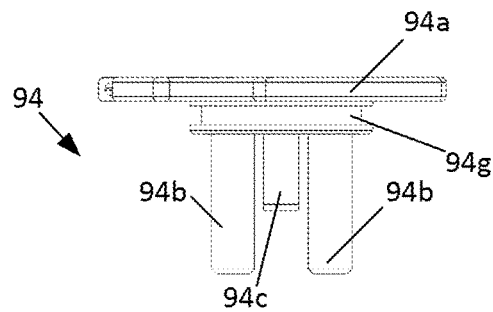
FIG. 84 is a top view of the second valve part shown in FIG. 80.
Figure 85:
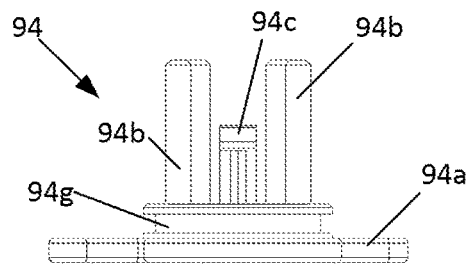
FIG. 85 is a bottom view of the second valve part shown in FIG. 80.
Figure 86:
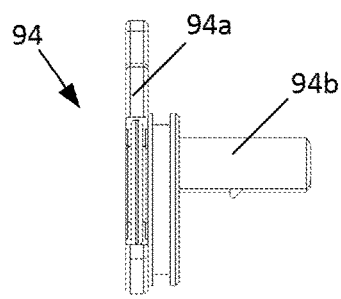
FIG. 86 is a front view of the second valve part shown in FIG. 80.
Figure 87:
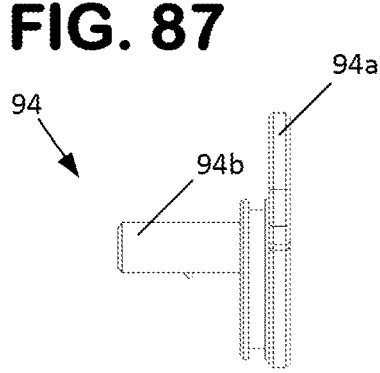
FIG. 87 is a rear view of the second valve part shown in FIG. 80.
Figure 88:
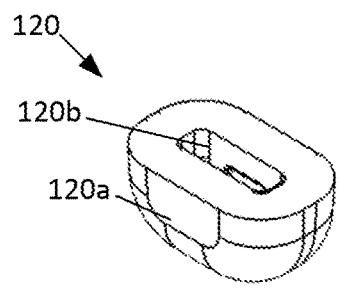
FIG. 88 is a perspective view of a dampening member of the transfer tube assembly shown in FIG. 60.
Figure 89:
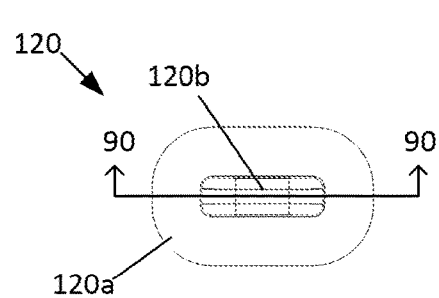
FIG. 89 is a top view of the dampening member shown in FIG. 88.
Figure 90:
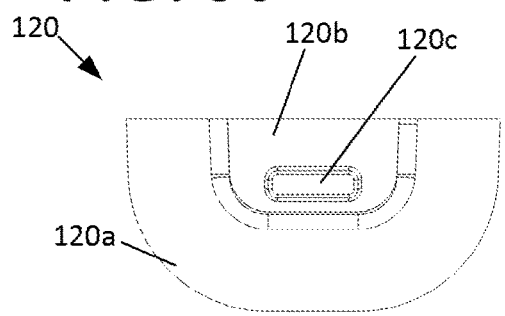
FIG. 90 is a cross-sectional view of the dampening member shown in FIG. 88, taken along the line 90-90 in FIG. 89.
Figure 91:
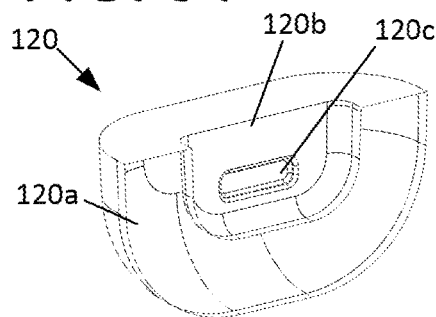
FIG. 91 is a perspective cross-sectional view of the dampening member shown in FIG. 88, taken along the line 90-90 in FIG. 89.

In one aspect, the tube half 84 is additionally provided with a stop structure 88, as can be seen most easily at FIG. 65. The stop structure 88 provides for a limiting function for the positioning of the valve assembly 90 such that the valve assembly 90 can only be rotated between two end stop points. To achieve this function, the stop structure 88 is provided with a first stop surface 88a and a second stop surface 88b which interact with a portion of the valve assembly 90, such as an operator portion or valve body.

By providing the tube structure 82 in two halves 84, 86, the valve body 92 (discussed later) of the valve assembly 90 can be installed within the sidewall portion 84c and cavity portion 86c prior to the tube halves 84, 86 being joined together. Once the tube halves 84, 86 are joined together, the valve body 92 is securely retained within the valve cavity 82c and can rotate within the valve cavity 82c to control the volumetric flow rate of the water flowing through the filter arrangement 10. Each tube half 84, 86 also defines a support leg 84d, 86d which together form the support structure 82c of the tube structure 82.

As most easily seen at FIGS. 63 and 66 to 71, the valve assembly 90 is shown in further detail. The valve assembly 90 allows for the volumetric flow rate through the transfer tube assembly 80 to be controlled manually by selectively providing resistance to the water pumped by the pump assembly 60 and passing through the tube structure 82. In some instances, it is undesirable for the filter arrangement 10 to operate at full flow capacity. For example, when food is added to the aquarium 12 it is desirable to have little or no flow through the filter arrangement to avoid the food being unintentionally drawn into the filter arrangement before it can be consumed. Also, where the filter arrangement 10 has a larger capacity than what is required for the aquarium 12 in which it is installed, the valve assembly 90 can be adjusted and set such that a desired flow rate through the filter arrangement 10 is achieved. As presented, the valve assembly 90 includes the aforementioned valve body 92, a valve operator 94, an indicator 96 attached to the valve operator 96, and a seal member 98. The valve assembly 90 is shown in isolation from the tube structure 92 at FIGS. 66-71.

Referring to FIGS. 72 to 79, the valve body 92 is shown in isolation. As presented, the valve body 92 is a unitarily formed component with a cylindrical body 92a within which a channel or passageway 92b is formed by sidewalls 92c, 92d, and 92e. A cavity 92g is also formed between the cylindrical body 92a and the sidewall 92c. The sidewall 92c extends between the sidewalls 92d, 92e and extends beyond the cylindrical body 92a to a distal end 92f. In one aspect, the sidewall 92c is provided with an aperture 92h for receiving a latch member of the valve operator 96. The distal end 92f has a radius and/or shape that generally matches the interior radius and/or shape of the tube structure 82. As constructed, the distal end 92f of the sidewall 92c functions as a stop or regulating member of the valve assembly 90. As such, the distal end 92f of the valve body 92 may be referred to more broadly as a valve member, stop member, or regulating member 92f. As can be most easily seen at FIG. 9, when the valve body 92 is rotated fully into an open flow position, the valve member 92f resides in a recessed area 82d of the tube structure 82. This allows water flowing through the valve assembly 90 to pass through the channel or passageway 92b of the valve body 92 relatively unobstructed along a flow path 93. When the valve body 92 is rotated within the tube structure 82, which is about an axis that is parallel to the top of the aquarium 12, the valve member 92f enters into the flow path 93 and provides resistance to the water flowing through the flow path 93. Thus, a desired flow rate through the tube structure 82 can be achieved by appropriately rotating the valve body 92. Although the axis of rotation of the valve body 92 is shown as being parallel to the top of the aquarium, other angles are possible.

In one aspect, the valve body 92 can be connected to and rotated via the valve operator 94. The valve operator 94 is shown in isolation at FIGS. 80 to 87. As shown, the valve operator 94 is unitarily formed with an operator portion 94a, a pair of engagement members 94b extending from the operator, and a connecting member 94c also extending from the operator portion 94a. The operator portion 94a provides a mechanism by which an operator can manipulate the rotational position of the valve body 92 by likewise rotating the operator portion 94a. In the example shown, the operator portion 94a is provided with a concave shaped recess 94h to allow a user's finger to more easily grip or engage the operator portion 94a. Other features such as knurls and ribs may be provided for tactile purposes as well.

The extension members 94b extend into the cavity 92g of the valve body 92 and engage with the valve body 92 such that a rotational force applied to the operator portion 94a is translated to the valve body 92. In one aspect, the extension members 92b and the cavity 92g have complimentary shapes for a relatively low tolerance engagement. The connecting member 94c is provided with a latch member 94d that is received by the aperture 92h in the valve body sidewall 92c to form a secure, snap-fit type connection.

In one aspect, the operator portion 94a includes a first stop surface 94e and a second stop surface 94f that respectively interact with the stop surfaces 88a, 88b of the stop structure 88 on the tube half 84. These surfaces cooperate to limit the rotation of the operator portion 94a, and by extension, the valve body 92. As such, the valve assembly 90 can be rotated to a fully open position when the operator stop surface 94e is engaged with the stop structure end stop surface 88a and can be rotated to a fully closed position when the operator stop surface 94f is engaged with the stop structure end stop surface 88b. It is noted that the fully closed position can be a position in which virtually all flow through the tube structure 82 is blocked or in which flow is restricted but still exists at some reduced rate. Additionally, it is noted that the stop surfaces 94e, 94f could also be provided on the valve body 92 rather than the operator 94.

The valve operator 94 can also be provided with a flanged recess 94g for retaining the seal member 98. The seal member 98 is most easily viewed as being retained in the flanged recess 94g at FIGS. 66 to 68. As stated, earlier, the valve body 92 is initially installed between the tube halves 84, 86 and the valve operator 94 is connected to the valve body 92 after the tube halves 84, 86 have been joined together. As such, a potential leak path exists at the location where the valve operator 94 is connected to the valve body 92. The seal member 98, configured as an O-ring, prevents such leakage by engaging with the cylindrical sidewall portion 84c of the tube half 84 once the valve operator 94 is joined to the valve body 92.

In one aspect, the valve operator 94 is provided with an indicator 96 that enables an operator to visually observe the relative position of the valve assembly 90. In the example shown, the operator portion is provided with a recessed area 94i for receiving the indicator 96 in a snap-fit type arrangement. The indicator 96 is most easily viewable at FIGS. 66 to 71, where it can be seen that the indicator 96 saddles each side of the operator portion 94a and generally follows the perimeter profile of the operator portion 94a. By providing the indicator 96 as a separate component, the indicator 96 can be more easily provided with a color that is different than the color of the operator portion 94a. For example, the indicator 96 can be molded from a red plastic material to differentiate it from a darker color from which the valve operator 94 is molded. However, it is entirely possible to provide an indicator 96 directly on the operator portion without requiring a separate component, such as by painting. As can be seen at FIGS. 1 to 6, the operator portion 94a of the valve operator 94 extends through an aperture 28a of the cover 28. Thus, the position of the valve assembly 90 can be manipulated by a user without requiring removal of the cover 28. The cover 28 can also include indicia 28b, such as "+" and "−" symbols to provide an indication to an operator as to which direction the operator portion 94a should be moved in order to provide more or less flow. When the operation portion 94a has been rotated to a sufficiently closed position, the indicator 96 will pass through the opening 28a and be viewable to a user. Thus, the indicator 96 can provide a visual alert to an operator that the filter arrangement 10 is not operating at full capacity.

Figure 60:
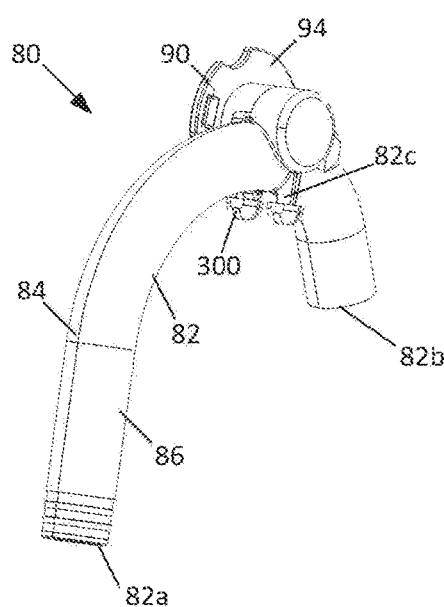
FIG. 60 is a perspective view of a transfer tube assembly of the filter arrangement shown in FIG. 1.
Figure 60A:
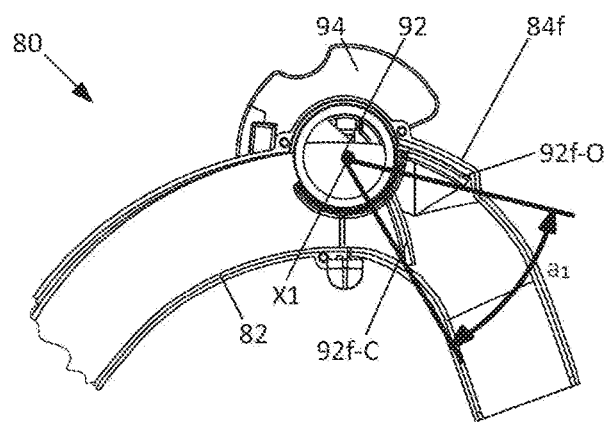
FIG. 60A is a cross-sectional side view of a portion of the transfer tube assembly shown in FIG. 60.
Figure 61:
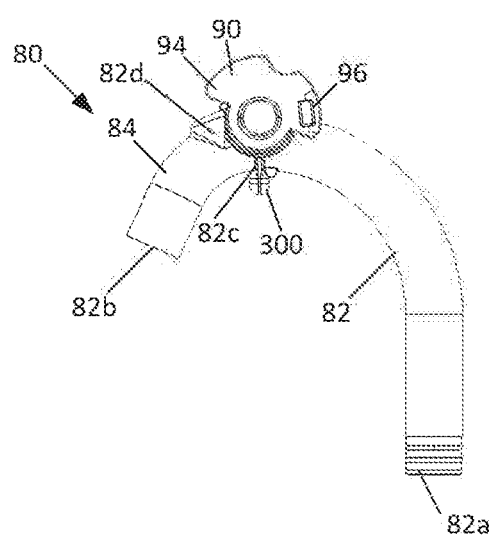
FIG. 61 is a side view of the transfer tube assembly shown in FIG. 60.
Figure 62:
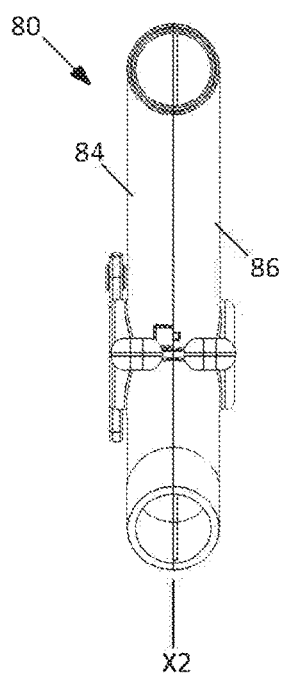
FIG. 62 is a bottom view of the transfer tube assembly shown in FIG. 60.
Figure 63:
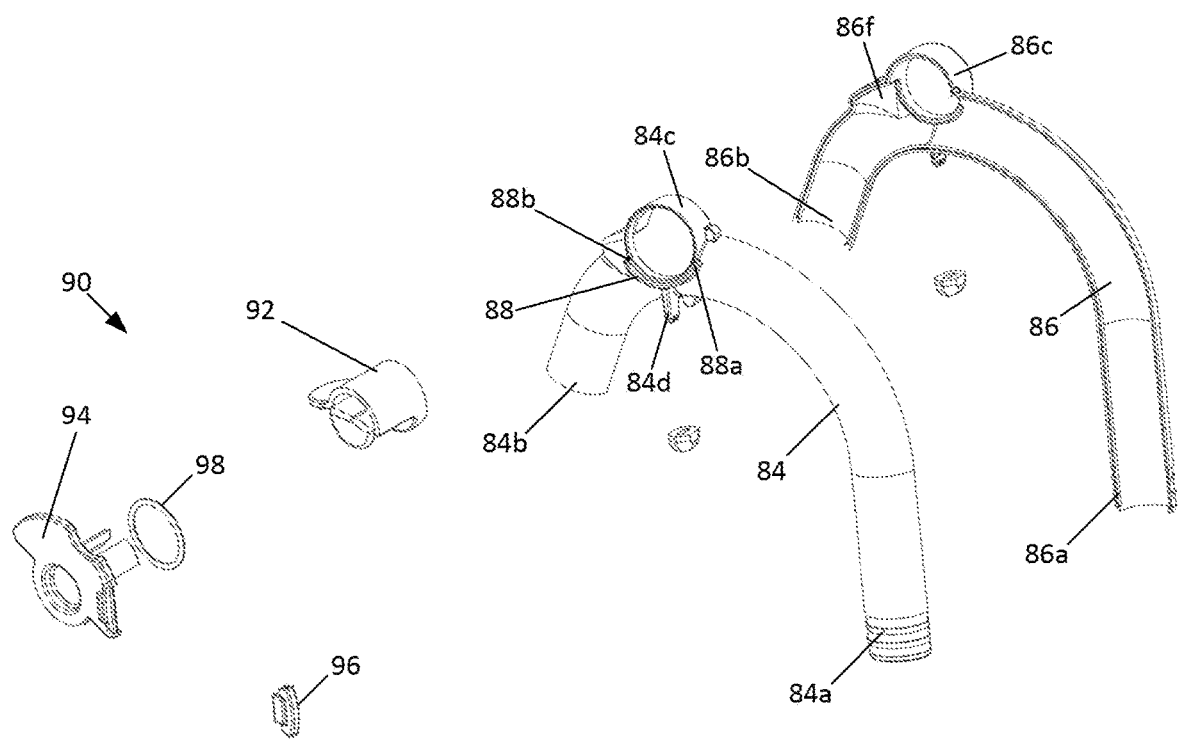
FIG. 63 is an exploded perspective view of the transfer tube assembly shown in FIG. 60.
Figure 64:
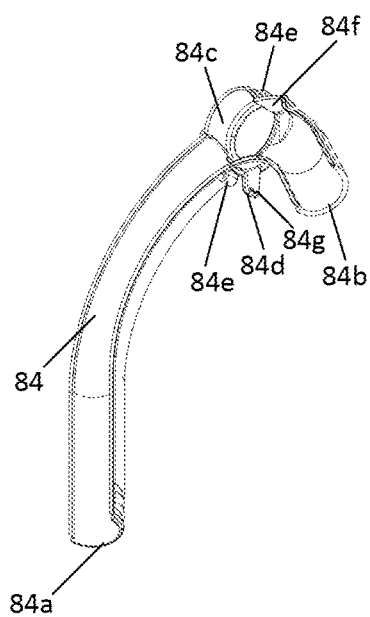
FIG. 64 is a perspective view of a first tube half of the transfer tube assembly shown in FIG. 60.

With reference to FIG. 60A, the operation of the valve body 92 within the transfer tube halves 84 can be most easily viewed. In FIG. 60A, the valve member 92f is shown in an open position, as referenced at 92f-O, and is shown in the closed position, as referenced at 92f-C. The valve body 92 rotates between the open and closed positions about a rotational axis X1 through an angle a1. With the disclosed design, the valve body 92 and the valve operator 94 can be beneficially rotated between the fully open and closed positions with 90 degrees or less of total rotation. In the example shown, angle a1 is about 46 degrees. This relatively low value is advantageous in that an operator need not turn the operator 94 multiple times in order to move the valve body 92 between the open and closed positions. In one aspect, the rotational axis X1 is orthogonal or perpendicular to a longitudinal axis X2 (see FIG. 62) of the transfer tube assembly 80 and the constituent tube halves 84. By orienting the rotational axis X1 in such a manner, the operator 94 can be located on one side of the tube halves 84, thereby enabling the operator 94 to be placed in an ideal use for an operator.

In the example embodiments presented, the transfer tube assembly 80 can be constructed with isolation features that minimize or eliminate the transfer of vibration and sound to the housing 22 of the filter housing assembly 20. As described previously, each tube half 84, 86 of the tube structure defines a support leg 84d, 86d which together form the support structure 82c of the tube structure 82. As most easily viewed at FIGS. 60-62, a dampening member 120 is inserted onto each of the support legs 84d, 86d. The dampening members 120, shown in isolation at FIGS. 88-91, can be formed from the same types of elastomeric materials as already described for dampening members 100, 100. Each dampening member 120 is provided with a main body 120a defining a generally hemi-spherical or oblong rounded shape defining a recess 120b for receiving the support leg 84d or 86d. In one aspect, the recess 120b can include a further pair of recesses 120c for receiving protrusions 84g, 86g extending from the opposite surfaces of the support legs 84d, 86d. The interaction of the protrusions 84g, 86g and the recesses 120c aid in locking the dampening members 120 to the support legs 84d, 86d. As most easily viewed at FIGS. 9 and 10, the dampening members 120 are received within a recessed area 22h defined in the housing 22. This configuration allows for the entire transfer tube assembly 80 to be supported by the dampening member 120 and by the dampening member 100 such that hard plastic-to-plastic contact between the transfer tube assembly 80 and the housing 22 can be avoided. Thus, any vibration or sound that is transferred to the transfer tube assembly 80 from the pump 70 is further isolated from being transmitted to the housing 22 by the dampening member 120. Furthermore, any vibration or sound generated within the transfer tube assembly 80, which is not generally expected but could potentially occur at the valve assembly 90, is also isolated from the housing.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

What is claimed is:

1. A transfer tube assembly of an aquarium filter arrangement for an aquarium, the transfer tube assembly comprising:
   a) a tube structure including a first tube half and a second tube half mated to the first tube half, the tube structure defining a valve cavity between an inlet end of the tube structure and an outlet end of the tube structure;
   b) a valve body rotatably disposed within the valve cavity of the tube structure, the valve body being rotatable to limit water flow through the tube structure and having a rotational axis that is perpendicular to a longitudinal axis of the tube structure;
   c) a valve operator connected to the valve body, the valve operator being for manipulating the rotational position of the valve body, wherein the valve body can be rotated between a closed position and an open position in 90 degrees or less of rotation of the valve operator; and
   d) a seal member providing a seal between the valve operator and the tube structure.

2. The transfer tube assembly of claim 1, wherein tube structure includes a first stop surface against which the valve operator abuts when the valve operator is rotated to a position corresponding to the valve body being in a fully open position.

3. The transfer tube assembly of claim 2, wherein the tube structure includes a second stop surface against which the valve operator abuts when the valve operator is rotated to a position corresponding to the valve body being in a relatively closed position.

4. The transfer tube assembly of claim 1, wherein the tube structure defines a recessed portion within which a valve member of the valve body resides when the valve body is in a fully open position.

5. A method for constructing a transfer tube assembly of an aquarium filter arrangement for an aquarium, the method comprising:
   inserting a valve body into a first cavity portion of a first tube half;
   joining a second tube half to the first tube half such that the valve body is received into a second cavity portion of the second tube half;
   bonding the first tube half to the second tube half to secure the valve body between the first and second tube halves; and
   mounting a valve operator to the valve body.

6. The method of claim 5, wherein the bonding step includes sonic welding.

7. The method of claim 5, wherein the step of mounting the valve operator includes mounting the valve operator such that a seal member forms a seal between the valve operator and the first tube half.

* * * * *